(12) United States Patent
Sasaki et al.

(10) Patent No.: US 12,510,700 B2
(45) Date of Patent: Dec. 30, 2025

(54) POLARIZATION ELEMENT, METHOD OF MANUFACTURING POLARIZATION ELEMENT, AND HEAD-UP DISPLAY APPARATUS

(71) Applicant: Dexerials Corporation, Shimotsuke (JP)

(72) Inventors: Koji Sasaki, Shimotsuke (JP); Naoki Hanashima, Shimotsuke (JP); Kazuyuki Shibuya, Shimotsuke (JP)

(73) Assignee: Dexerials Corporation, Shimotsuke (JP)

( * ) Notice: Subject to any disclaimer, the term of this patent is extended or adjusted under 35 U.S.C. 154(b) by 629 days.

(21) Appl. No.: 17/596,948

(22) PCT Filed: Jun. 26, 2020

(86) PCT No.: PCT/JP2020/025247
§ 371 (c)(1),
(2) Date: Dec. 22, 2021

(87) PCT Pub. No.: WO2020/262616
PCT Pub. Date: Dec. 30, 2020

(65) Prior Publication Data
US 2022/0260768 A1   Aug. 18, 2022

(30) Foreign Application Priority Data

Jun. 28, 2019 (JP) .................................. 2019-121708
Jan. 23, 2020 (JP) .................................. 2020-009067
Jun. 25, 2020 (JP) .................................. 2020-109985

(51) Int. Cl.
*G02B 5/30* (2006.01)
*B60K 35/23* (2024.01)
(Continued)

(52) U.S. Cl.
CPC ............ *G02B 5/3058* (2013.01); *B60K 35/23* (2024.01); *B60K 35/60* (2024.01); *G02B 27/0101* (2013.01); *G02B 27/0149* (2013.01)

(58) Field of Classification Search
CPC .............. G02B 5/3058; G02B 27/0101; G02B 27/0149
(Continued)

(56) References Cited

U.S. PATENT DOCUMENTS 10,209,420 B2 * 2/2019 Takeda ..................... G02B 1/14
10,209,421 B2 * 2/2019 Takeda ................. G02B 5/3058
(Continued)

FOREIGN PATENT DOCUMENTS

CN     109557605 A    4/2019
JP     2006003447 A   1/2006
(Continued)

OTHER PUBLICATIONS

Dec. 27, 2023, Office Action issued by the Taiwan Intellectual Property Office in the corresponding Taiwanese Patent Application No. 109121854.
(Continued)

*Primary Examiner* — Ricky D Shafer
(74) *Attorney, Agent, or Firm* — KENJA IP LAW PC

(57) ABSTRACT

To provide a polarization element having good polarization properties and excellent in heat dissipation property and manufacturing costs. In order to solve the above problem, a polarization element 1 of the present disclosure includes a substrate 10 made of a transparent inorganic material; a grid structural body 20 which is made of a transparent material, and includes a base portion 21 provided along a surface of the substrate 10 and protruding portions 22 protruding from the base portion 21 in a grid; and an optical functional layer 30 which is formed on the protruding portions 22, and
(Continued)

includes an absorptive layer for absorbing light, a reflective layer for reflecting light, or a multilayer having at least the absorptive layer and the reflective layer.

12 Claims, 25 Drawing Sheets

(51) Int. Cl.
  *B60K 35/60* (2024.01)
  *G02B 27/01* (2006.01)
(58) Field of Classification Search
  USPC .................................. 359/485.05, 487.03
  See application file for complete search history.

(56) References Cited

U.S. PATENT DOCUMENTS

| | | | | |
|---|---|---|---|---|
| 10,859,743 | B2* | 12/2020 | Takeda | B29D 11/00644 |
| 11,543,702 | B2* | 1/2023 | Shibuya | G02F 1/133548 |
| 11,874,484 | B2* | 1/2024 | Oowada | G02B 5/0858 |
| 11,971,568 | B2* | 4/2024 | Shibuya | F21V 9/14 |
| 2008/0316599 | A1* | 12/2008 | Wang | G02B 5/3058 |
| | | | | 359/485.05 |
| 2009/0219617 | A1* | 9/2009 | Asakawa | G02B 5/3058 |
| | | | | 359/485.05 |
| 2010/0259821 | A1* | 10/2010 | Kaida | C08F 292/00 |
| | | | | 359/485.05 |
| 2011/0096396 | A1* | 4/2011 | Kaida | C23C 14/225 |
| | | | | 427/126.3 |
| 2011/0170187 | A1* | 7/2011 | Sawaki | G02B 5/3058 |
| | | | | 359/485.03 |
| 2012/0168065 | A1* | 7/2012 | Kaida | G03F 7/038 |
| | | | | 156/246 |
| 2014/0063467 | A1* | 3/2014 | Takahashi | G02B 5/3058 |
| | | | | 353/20 |
| 2018/0224589 | A1 | 8/2018 | Takada et al. | |
| 2019/0094436 | A1 | 3/2019 | Takeda | |
| 2019/0331840 | A1* | 10/2019 | Takada | G02B 5/3058 |
| 2020/0371277 | A1* | 11/2020 | Oowada | G02F 1/1335 |
| 2021/0055591 | A1* | 2/2021 | Shibuya | G02F 1/133548 |
| 2021/0132276 | A1* | 5/2021 | Ryu | G02B 5/3041 |
| 2021/0181504 | A1* | 6/2021 | Sugiyama | G02B 27/0101 |

FOREIGN PATENT DOCUMENTS

| | | |
|---|---|---|
| JP | 2008083657 A | 4/2008 |
| JP | 2008181113 A | 8/2008 |
| JP | 2009192586 A | 8/2009 |
| JP | 2011227130 A | 11/2011 |
| JP | 2015007763 A | 1/2015 |
| JP | 2015210416 A | 11/2015 |
| JP | 2017173832 A | 9/2017 |
| JP | 2018072507 A | 5/2018 |
| JP | 2019061047 A | 4/2019 |
| TW | 201007230 A1 | 2/2010 |
| WO | 2010005059 A1 | 1/2010 |
| WO | 2014027458 A1 | 2/2014 |
| WO | 2014027459 A1 | 2/2014 |

OTHER PUBLICATIONS

Nov. 3, 2023, Office Action issued by the China National Intellectual Property Administration in the corresponding Chinese Patent Application No. 202080046819.5.
Sep. 29, 2020, International Search Report issued in the International Patent Application No. PCT/JP2020/025247.
Dec. 28, 2021, International Preliminary Report on Patentability issued in the International Patent Application No. PCT/JP2020/025247.
Mar. 30, 2024, Office Action issued by the China National Intellectual Property Administration in the corresponding Chinese Patent Application No. 202080046819.5.
Jul. 11, 2023, the Extended European Search Report issued by the European Patent Office in the corresponding European Patent Application No. 20832986.2.
Nov. 24, 2025, Communication pursuant to Article 94(3) EPC issued by the European Patent Office in the corresponding European Patent Application No. 20832986.2.

* cited by examiner

FIG. 1A
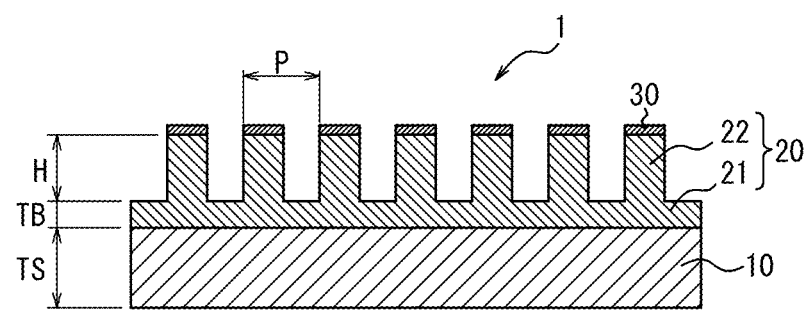
FIG. 1B
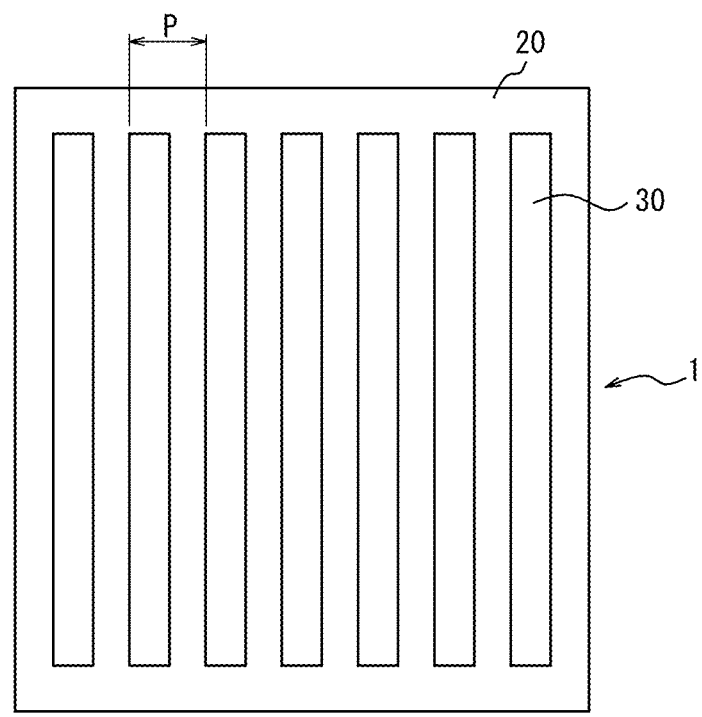
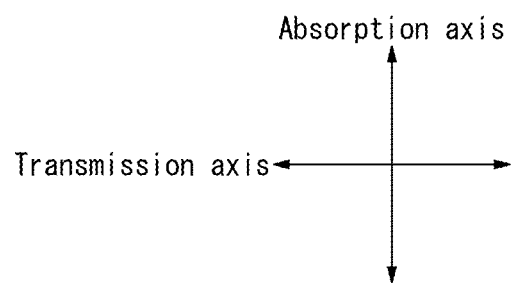

Al₂O₃_8nm deposition

Al₂O₃_8nm deposition

Absorptive layer: Ge        Protective layer: Al₂O₃

POLARIZATION ELEMENT, METHOD OF MANUFACTURING POLARIZATION ELEMENT, AND HEAD-UP DISPLAY APPARATUS

TECHNICAL FIELD

The present disclosure relates to a polarization element having good polarization properties and excellent in heat dissipation property and manufacturing costs, a method of manufacturing such a polarization element, and a head-up display apparatus excellent in polarization properties and heat resistance.

BACKGROUND

A number of head-up display apparatuses for vehicles have recently been developed which display images on a semi-transmissive plate (hereinafter collectively referred to as "display surface"), such as a windshield of a vehicle or a combiner. A head-up display apparatus for a vehicle is, for example, a video display apparatus provided on a dashboard of the vehicle for projecting light of an image onto a windshield, to thereby display driving information as an imaginary image. The driver can see the imaginary image simultaneously with the scenery through the windshield. Such a display apparatus is thus advantageous in that it requires fewer eye movements than conventional display apparatuses such as a liquid crystal display disposed out of the area of the windshield.

A head-up display apparatus as described above emits an image to be displayed from below toward the surface of the windshield (upward). Hence, sunlight may be incident on the display element so as to oppose to the direction of emission of a display image. A head-up display apparatus typically includes a reflector for reflecting or magnifying a display image for the purpose of meeting the demands for downsizing the apparatus while enlarging the display image area. In such a configuration, sunlight incident on the head-up display is focused near the display element and heat is generated, which may cause degradation or failure of the display element.

For this reason, for the purpose of preventing sunlight from entering a display element, one techniques has been developed in which a head-up display is provided with a reflective polarization element. For example, PTL 1 discloses a head-up display provided with a reflective polarization element (wire-grid polarization plate) provided between a reflector and a display element.

Here, examples of polarization elements provided in head-up displays as described above include, for example, a polarization element including a polarization element made of a birefringent resin, a wire-grid polarization element including a plurality of conductors (metal thin wires) extending in parallel to each other on a transparent substrate, and a polarization element made of a cholesteric phase liquid crystal. Of these, wire-grid polarization elements are often used because of their excellent polarization properties. A wire-grid polarization element includes a wire grid formed from conductive wires which are made of a metal or the like, and are disposed in a grid at a certain pitch. The pitch of the wire grids is set to be smaller than (one-half or less of) the wavelength of incident light (e.g., light in the visible light range), so that the wire-grid polarization element is configured so as to reflect most of light of an electric field vector component oscillating in parallel to the conductive wires, while permitting most of light of an electric field vector component perpendicular to the conductive wires to pass through. This enables the wire-grid polarization element to be used as a polarization element for producing single polarization light. This polarization element is also desirable in view of effective utilization of light because light that does not pass through can be reflected and reused.

As one wire-grid polarization element, for example, PTL 2 discloses a wire-grid polarization element including a resin base material having projecting portions in a grid, a dielectric layer provided so as to cover the grid-like projecting portions of the resin base material and at least a part of the sides thereof, and metal wires provided on the dielectric layer.

In addition, PTL 3 discloses a wire-grid polarization element including a base material made of a resin or the like having a protrusion/recess structure extending in a certain direction on a surface, and a conductor provided so as to be unevenly distributed on one side of projecting portions of the protrusion/recess structure, wherein the pitch, which is the distance between two adjacent projecting portions, and the height of the projecting portions are adjusted in a cross-sectional view in the perpendicular direction relative to the extension direction of the protrusion/recess structure.

CITATION LIST

Patent Literature

PTL 1: JP 2018-72507 A
PTL 2: JP 2008-83657 A
PTL 3: JP 2017-173832 A

SUMMARY

Technical Problem

In general, the temperature environment required for in-vehicle apparatuses ranges from −40 to 105° C. In view of, however, use in a high-temperature environment, particularly that of a head-up display mounted on a dashboard of a vehicle in summer, higher heat resistance and higher heat dissipation property are required. The techniques of PTLs 1-3 are fundamentally wire-grid polarization elements made of resin base materials, and the wire-grid polarizing plates per se do not have sufficient heat resistance and heat dissipation property. In addition, a wire grid polarization element made of a resin base material described above is typically attached to a glass base material by means of a double-sided tape (optically clear adhesive; OCA). In this configuration, issues of stray light caused by waviness of the layer base material and warping of the polarization layer due to heat have created demands for further improvements.

In the wire-grid polarization element of PTL 3, the grid-like protrusion/recess shape is formed on the surface of the base material upon manufacturing. Thus, selection of a material is difficult in view of the processability and the heat dissipation property, and achieving both excellent polarization properties and a good heat dissipation property is difficult.

Further, conventional wire-grid polarization elements require high manufacturing costs and are not suited to mass production because protrusion/recess shapes on the surface thereof are typically formed by photolithography and etching techniques.

The present disclosure has been made in light of the circumstances set forth above, and an object thereof is to provide a polarization element having good polarization properties and excellent in heat dissipation property and manufacturing costs and a method of manufacturing such a polarization element. Another object of the present disclosure is to provide a head-up display apparatus excellent in polarization properties and heat resistance.

Solution to Problem

As a result of intensive research to solve the above described problem, the inventors of the present disclosure have found that usage of a substrate of a polarization element made of a transparent inorganic material, and configuring a grid structural body provided with an protrusion/recess structure to include a base portion provided along a surface of the substrate and protruding portions protruding from the base portion in a grid can improve the heat dissipation effect while maintaining excellent polarization properties. Further, it was found that the above-described grid structural body provided in the base portion and the protruding portions can be formed by a technique such as nanoimprinting. This can reduce the manufacturing costs as compared to cases where photolithography and etching techniques is used, as well as allowing for mass production.

The present disclosure is made on the basis of the above described findings, and the scope thereof is as follows:

(1) A polarization element including:
a substrate made of a transparent inorganic material;
a grid structural body which is made of a transparent material, and includes a base portion provided along a surface of the substrate and protruding portions protruding from the base portion in a grid; and
an optical functional layer which is formed on the protruding portions, and includes an absorptive layer for absorbing light, a reflective layer for reflecting light, or a multilayer having at least the absorptive layer and the reflective layer.

(2) The polarization element according to the above (1), wherein the base portion has a thickness of 1 nm or more.

(3) The polarization element according to the above (1) or (2), wherein the protruding portions have rectangular, trapezoidal, polygonal, or oval shapes in a cross-sectional view perpendicular to an absorption axis direction or a reflection axis direction of the polarization element.

(4) The polarization element according to any one of the above (1) to (3), wherein the optical functional layer is formed on at least ends of the protruding portions.

(5) The polarization element according to any one of the above (1) to (4), wherein the optical functional layer is not formed on the base portion.

(6) The polarization element according to the above (4) or (5), wherein the optical functional layer is formed on the ends of the protruding portions and a part of sides of the protruding portions.

(7) The polarization element according to the above (6), wherein the optical functional layer formed on the part of the sides of the protruding portions is formed in a range so as to cover 10% or more of a height of the protruding portions.

(8) The polarization element according to any one of the above (1) to (7), wherein the inorganic material of the substrate is different from the material of the grid structural body.

(9) The polarization element according to any one of the above (1) to (8), further including a protective layer formed so as to cover at least a surface of the optical functional layer.

(10) The polarization element according to the above (9), wherein the protective layer includes a water-repellent coating or an oil-repellent coating.

(11) The polarization element according to the above (1) to (10), wherein the optical functional layer includes a multilayer having at least the absorptive layer and the reflective layer.

(12) The polarization element according to the above (11), wherein the optical functional layer further includes a dielectric layer between the reflective layer and the absorptive layer.

(13) A method of manufacturing a polarization element, including the steps of:
forming a grid structural body material made of a transparent material on a substrate made of an inorganic material;
forming, by applying nanoimprinting to the grid structural body material, a grid structural body including a base portion provided along a surface of the substrate and protruding portions protruding from the base portion in a grid; and
forming, on the protruding portions, an optical functional layer including an absorptive layer for absorbing light, a reflective layer for reflecting light, or a multilayer including at least the absorptive layer and the reflective layer.

(14) The method of manufacturing a polarization element according to the above (13), wherein the step of forming the optical functional layer includes forming layers alternately from a plurality of directions on the protruding portions by sputtering or evaporation.

(15) A head-up display apparatus including a polarization element according to any one of the above (1) to (14).

(16) The head-up display apparatus according to the above (15), further including a heat dissipating member provided around the polarization element.

Advantageous Effect

According to the present disclosure, it is possible to provide a polarization element having good polarization properties and excellent in heat dissipation property and manufacturing costs and a method of manufacturing such a polarization element. According to the present disclosure, it is also possible to provide a head-up display apparatus excellent in polarization properties and heat resistance.

BRIEF DESCRIPTION OF THE DRAWINGS

In the accompanying drawings:

FIG. 1 are diagrams illustrating one embodiment of a polarization element of the present disclosure, wherein FIG. 1A is a cross-sectional view schematically illustrating one embodiment of a polarization element of the present disclosure, and FIG. 1B is a top view schematically illustrating the embodiment of the polarization element of the present disclosure;

FIG. 8 are images of one embodiment of the polarization element of the present disclosure taken under magnification by a scanning electron microscope (SEM), wherein

FIG. 9 are diagrams for illustrating a method of manufacturing a polarization element of the present disclosure, wherein

FIG. 10 are diagrams for illustrating a conventional method of manufacturing a polarization element, wherein

FIG. 11 are diagrams for illustrating an example of steps of manufacturing a mold used for nanoimprinting of a grid structural body, wherein

DETAILED DESCRIPTION

Figure 2:
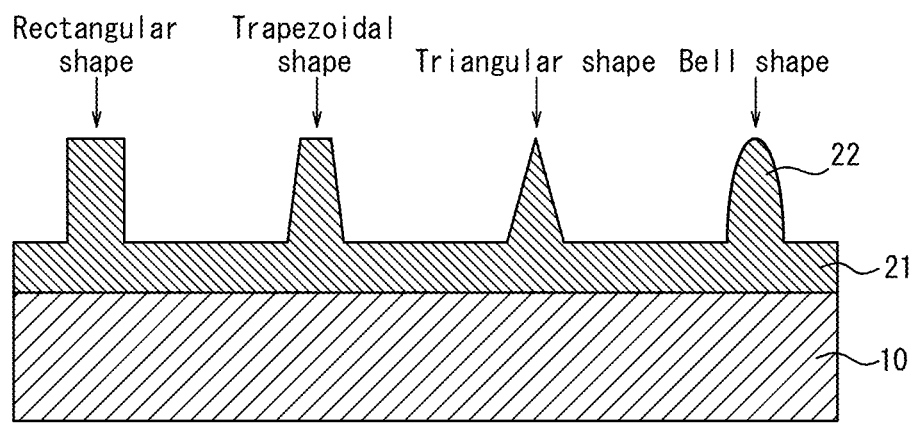
FIG. 2 is a diagram schematically illustrating examples of the cross-sectional shape of protruding portions of a grid structural body of the polarization element.

Embodiments of a polarization element and embodiments of a head-up display of the present disclosure will be described in detail below with reference to the drawings where necessary. Note that some of members disclosed in FIGS. 1 to 13 may be schematically illustrated, and shapes may not be in scale or may be different from the actual ones for convenience of explanation.

<Polarization Element>

First, one embodiment of a polarization element of the present disclosure will be described.

As illustrated in FIGS. 1A and 1B, a polarization element of the present disclosure is a polarization element 1 including a substrate 10 made of a transparent inorganic material; a grid structural body 20 which is made of a transparent material, and includes a base portion 21 provided along a surface of the substrate 10 and protruding portions 22 protruding from the base portion 21 in a grid; and an optical functional layer 30 which is formed on the protruding portions 22, and includes an absorptive layer for absorbing light, a reflective layer for reflecting light, or a multilayer having at least the absorptive layer and the reflective layer.

By using the substrate 10 of the polarization element 1 made from an inorganic material having a high thermal conductivity, and by configuring the grid structural body 20 provided with a protrusion/recess structure to include the base portion 21 provided along a surface of the substrate 10 and the protruding portions 22 protruding from the base portion 21 in a grid, it is possible to configure the polarization element 1 from the substrate 10 of the inorganic material and the grid structural body having the thin base portion 21. This provides advantageous effects in terms of the thermal resistance value, which leads to excellent polarization properties as well as improving the heat dissipation effect. Additionally, as described above, because the grid structural body 20 includes the base portion 21 and the protruding portions 22, both of which can be formed by a technique such as nanoimprinting. As a result, the costs for and complexity of manufacturing can be reduced as compared to cases where photolithography and etching techniques are used.

In conventional layer-type organic polarizing plates, on the other hand, organic materials are used in a large amount and the thicknesses of a substrate (base layer), a double-sided tape (optically clear adhesive; OCA), and a grid structural body are increased. Accordingly, the heat dissipation property and the heat resistance are considered to be inferior to those of the polarization element of the present disclosure.

The members of one embodiment of the polarization element of the present disclosure are described below.

(Substrate)

As illustrated in FIG. 1A, the polarization element 1 of the present disclosure includes the substrate 10.

The substrate 10 is made of a transparent inorganic material. By using an inorganic material as the substrate 10, the thermal conductivity of the substrate 10 is increased, which in turn improves the heat dissipation property of the polarization element 1.

In this specification, the term "transparent" means that the transmittance of light in wavelengths within the usage band (the band of visible light and infrared light) is high, for example, the transmittance of such light is 70% or higher. The polarization element 1 made of the material transparent to light in the usage band does not affect the polarization properties of the polarization element 1, transmission of light, and the like.

Examples of the material of the substrate 10 includes, for example, various types of glass, quartz, crystallized quartz, sapphire, and the like. Of these, the material of the substrate 10 is preferably a material having a thermal conductivity of 1.0 W/m·K or higher, and more preferably a material having a thermal conductivity of 8.0 W/m·K or higher. This is because a better heat dissipation property can be obtained.

The shape of the substrate 10 is not particularly limited, and can be selected as appropriate according to the performances and the like required for the polarization element 1. For example, the substrate 10 can be configured to have a plate shape or a curved surface. For avoiding possible effects on the polarization properties of the polarization element 1, the substrate 10 may have be a flat surface.

Additionally, the thickness TS of the substrate 10 is not particularly limited, and can range from 0.3 to 10.0 mm, for example.

(Grid Structural Body)

As illustrated in FIG. 1A, the first embodiment of the polarization element of the present disclosure further includes, on the substrate 10, the grid structural body 20 which is made of a transparent material, and includes a base portion 21 provided along a surface of the substrate 10 and protruding portions 22 protruding from the base portion 21 in a grid.

An optical functional layer 30, which will be described below, provided on the grid-like protruding portions 22 formed on the surface enables the grid structural body 20 to achieve desired polarization properties.

While light incident on the surface on which the protruding portions 22 of the grid structural body 20 are formed passes through the optical functional layer 30, the light is partially absorbed and attenuated in cases where the optical functional layer 30 described below has an absorptive property. Or, in cases where the optical functional layer 30 has a reflective property, incident light is partially reflected while it passes through the optical functional layer 30. Among light passing through the optical functional layer 30, light having an electric field component in the direction (transmission axis direction) orthogonal to the longitudinal direction (absorption axis direction or reflection axis direction) of the protruding portions 22 passes through the polarization element 1 at a high transmittance. On the other hand, among light passing through the optical functional layer 30, most of light having an electric field component in the direction parallel to the longitudinal direction of the protruding portions 22 (absorption axis direction or reflection axis direction) is reflected or absorbed by the optical functional layer 30. Accordingly, in a first embodiment of the polarization element of the present disclosure, provision of the grid structural body 20 having the optical functional layer 30 to be described later formed thereon can produce single polarization. A similar polarization effect can also be achieved for light incident from the back side of the substrate 10.

As illustrated in FIG. 1A, the grid structural body 20 has the base portion 21. The base portion 21 is a portion provided along a surface of the substrate 10 for supporting the protruding portions 22. The base portion 21 is inevitably formed when a protrusion/recess shape (protruding portions 22) of the grid structural body 20 is formed by a technique such as nanoimprinting. In addition, provision of the base portion 21 in the grid structural body 20 increases the strength of the protruding portions 22 as compared to cases where the protruding portions 22 is formed directly on the substrate 10, which increases the durability of the grid structural body 20. Further, because the base portion 21 is adhered to the substrate 10 on the entire surface thereof, the peeling resistance of the grid structural body 20 is increased.

Although the thickness TB of the base portion 21 is not particularly limited, the thickness TB is preferably 1 nm or more, more preferably and 10 nm or more, in view of assuring more secure support of the protruding portions 22 as well as ease of imprint shaping. Further, in view of ensuring a good heat dissipation property, the thickness TB of the base portion 21 is preferably 50 μm or less, and more preferably 30 μm or less.

As illustrated in FIGS. 1A and 1B, the grid structural body 20 further includes the protruding portions 22 protruding from the base portion 21. As illustrated in FIG. 1B, the protruding portions 22 extend along a longitudinal direction which coincides with the absorption axis or the reflection axis of the polarization element 1 of the present disclosure, and the plurality of the protruding portions 22 form a grid shape.

Here, as illustrated in FIGS. 1A and 1B, the interval P between the protruding portions 22 in a cross-sectional view perpendicular to the absorption axis direction or the reflection axis direction of the polarization element 1 need to be shorter than wavelengths of light in the usage band. This is to provide the polarization effect described above. More specifically, the interval P between the protruding portions 22 is preferably 50 to 300 nm, more preferably 100 to 200 nm, and particularly preferably 100 to 150 nm in view of balancing between ease of forming of the protruding portions 22 and the polarization properties.

Further, the width W of the protruding portions 22 in a cross-sectional view perpendicular to the absorption axis direction or the reflection axis direction of the polarization element 1 as illustrated in FIGS. 1A and 1B is not particularly limited. However, in view of balancing between ease of manufacturing and the polarization properties, the width W of the protruding portions 22 is preferably about 20 to about 150 nm, and more preferably 30 to 100 nm.

Note that the width W of the protruding portions 22 can be measured through an observation under a scanning electron microscope or a transmission electron microscope. In the present disclosure, a cross-section perpendicular to the absorption axis direction or the reflection axis direction of the polarization element 1 may be observed under a scanning electron microscope or a transmission electron microscope. The widths of arbitrary four protruding portions 22 at the respective centers of the height H of the protruding portions 22 may be measured, and the arithmetic mean value of these may be determined to be used as the width W of the protruding portions 22.

The height H of the protruding portions 22 in a cross-sectional view perpendicular to the absorption axis direction or the reflection axis direction of the polarization element 1 as illustrated in FIG. 1A is not particularly limited. However, in view of balancing between ease of manufacturing and the polarization properties, the height H of the protruding portions 22 is preferably about 50 to 300 nm, and more preferably about 100 to 250 nm.

Note that the height H of the protruding portions 22 can be measured through an observation under a scanning electron microscope or a transmission electron microscope. In the present disclosure, a cross-section perpendicular to the absorption axis direction or the reflection axis direction of the polarization element 1 may be observed under a scanning electron microscope or a transmission electron microscope. The heights of arbitrary four protruding portions 22 at the respective centers of the width W of the protruding portions 22 may be measured, and the arithmetic mean value of these may be determined to be used as the height H of the protruding portions 22.

The shape of the protruding portions 22 of the grid structural body 20 is not particularly limited, except that they protrude from the base portion 21 in a grid for providing the polarization properties.

The protruding portions 22 may have, for example, rectangular, trapezoidal, triangular, bell shapes, or the like, as illustrated in FIG. 2, in a cross-sectional view of the polarization element 1 orthogonal to the absorption axis direction or the reflection axis direction of the polarization element 1. The protruding portions 22 having any of these shapes facilitate formation of the optical functional layer 30 on the protruding portions 22, as well as imparting the polarization properties to the polarization element 1. In addition, these shapes can be formed by nanoimprinting, which provides advantages also in terms of ease of manufacturing. The shapes of recessed portions of the base portion 21 formed between 22 projecting in a grid can also have rectangular, trapezoidal, triangular, bell shapes, or the like, as illustrated in FIG. 25. The shape can be selected as appropriate in view of productivity, such as mold release upon nanoimprinting.

The material of the grid structural body 20 is not particularly limited as long as it is a transparent material, and well-known organic and inorganic materials may be used.

For example, materials such as various thermosetting resin, various ultraviolet curing resins, glass (spin-on-glass; SOG) are preferably used as the material of the grid structural body 20 in view of ensuring transparency and ease of manufacturing.

Further, the material of the grid structural body 20 may be the same as or different from the material of the substrate 10. Nevertheless, in view of ease of manufacturing and manufacturing costs, the material of the grid structural body may be different from the material of the substrate 10. Additionally, when the material of the grid structural body 20 is different from the material of the substrate 10, the refractive indices of the materials will be different. This facilitates adjustment of the refractive index of the polarization element 1 as a whole.

The method of forming the grid structural body 20 is not particularly limited as long as the method is capable of forming the base portion 21 and protruding portions 22 described above. For example, protrusion/recess formation methods by means of photolithography or imprinting may be used.

Of these, the base portion 21 and the protruding portions 22 of the grid structural body 20 are preferably formed by imprinting in view of forming the protrusion/recess pattern readily in short time, as well as ensuring reliable formation of the base 21.

For forming the base portion 21 and the protruding portions 22 of the grid structural body 20 by the nanoimprinting, for example, a material for forming the grid structural body 20 (grid structural body material) may be formed on the substrate 10. Thereafter, while a mold having protrusions and recesses formed therein is pressed against the grid structural body material, UV light irradiation or heating may be applied to cure the grid structural body material. This enables formation of the grid structural body 20 including the base portion 21 and the protruding portions 22.

(Optical Functional Layer)

In a first embodiment of the polarization element of the present disclosure, as illustrated in FIG. 1A, the polarization element 1 further includes an optical functional layer 30 which is formed on the protruding portions 22 of the grid structural body 20, and includes an absorptive layer for absorbing light, a reflective layer for reflecting light, or a multilayer having at least the absorptive layer and the reflective layer.

The multilayer 30 can absorb and/or reflect a part of incident light, thereby imparting desired polarization properties to the polarization element 1.

As illustrated in FIG. 1A, the reflective layer composing the optical functional layer 30 is formed on the protruding portions 22 of the grid structural body 20, to thereby reflect light having an electric field component in the direction parallel to the longitudinal direction of the protruding portions 22 (reflection axis direction), among light incident on the polarization element 1.

The material of the reflective layer is not particularly limited as long as the material has reflectivity to light in the usage band. Exemplary materials include a single element such as Al, Ag, Cu, Mo, Cr, Ti, Ni, W, Fe, Si, Ge, and Te, or an alloy containing one or more of these elements, for example.

As illustrated in FIG. 1A, the absorptive layer composing the optical functional layer 30 is formed on the protruding portions 22 of the grid structural body 20, to thereby absorb light having an electric field component in the direction parallel to the longitudinal direction of the protruding portions 22 (absorption axis direction), among light incident on the polarization element 1. The absorbed light is converted into heat, which is then dissipated through the substrate 10 described above.

The material of the absorptive layer is not particularly limited as long as the material is capable of absorbing light in the usage band. Exemplary materials include dielectric and non-dielectric materials.

Examples of the dielectric materials include, for example, oxides of elements such as Si, Al, Be, Bi, Ti, Ta, and B; nitrides of elements such as Si and B; fluorides of elements such as Mg and Ca; Si, Ge, carbon, and cryolite. One of these dielectric materials may be used alone, or two or more may of these be used in combination. In cases where two or more dielectric materials are used in combination, the two or more dielectric materials may be mixed together or the dielectric materials may be used independently in different locations in the layer thickness direction.

Examples of the non-dielectric material include, for example, at least one single element selected from the group consisting of Fe, Ta, Si, Ti, Mg, W, Mo, and Al (except for a single Si element) or an alloy thereof. Examples of the alloy include a FeSi alloy and a TaSi alloy. The Fe content in the FeSi alloy is preferably 50 atm % or less, and more preferably 10 atm % or less, in view of the reflectance and the transmittance. The Ta content in the TaSi alloy is preferably 40 atm % or less in view of the reflectance and the transmittance. One of these non-dielectric materials may be used alone, or two or more of these may be used in combination. In cases where two or more non-dielectric materials are used in combination, the two or more non-dielectric materials may be mixed together or the non-dielectric materials may be used independently in different locations in the layer thickness direction.

Of these, preferably, that the dielectric material includes at least one of Si and a Si oxide (e.g., silica) and the non-dielectric material includes a metal. Examples of the metal include, for example, at least one single metal element selected from the group consisting of Fe, Ta, W, Mo, and Al, or an alloy of these metals. Combining at least one of Si and a Si oxide with a metal to form a cermet tends to further improve the heat resistance of the absorptive layer.

Further, the content of the non-dielectric material in the absorptive layer may be varied in the layer thickness direction. Such a varied content tends to improve the optical properties of the polarization element 1. The wavelength at the minimum point of the reflectance along the absorption axis Rs can be controlling by adjusting how the content of the non-dielectric material is varied.

The multilayer composing the optical functional layer 30 is a layer including at least the reflective layer and the absorptive layer described above. Usage of the multilayer as the optical functional layer 30 can affect both reflection of light by the reflective layer and absorption of light by the absorptive layer, to thereby achieve more excellent polarization properties.

Figure 26:
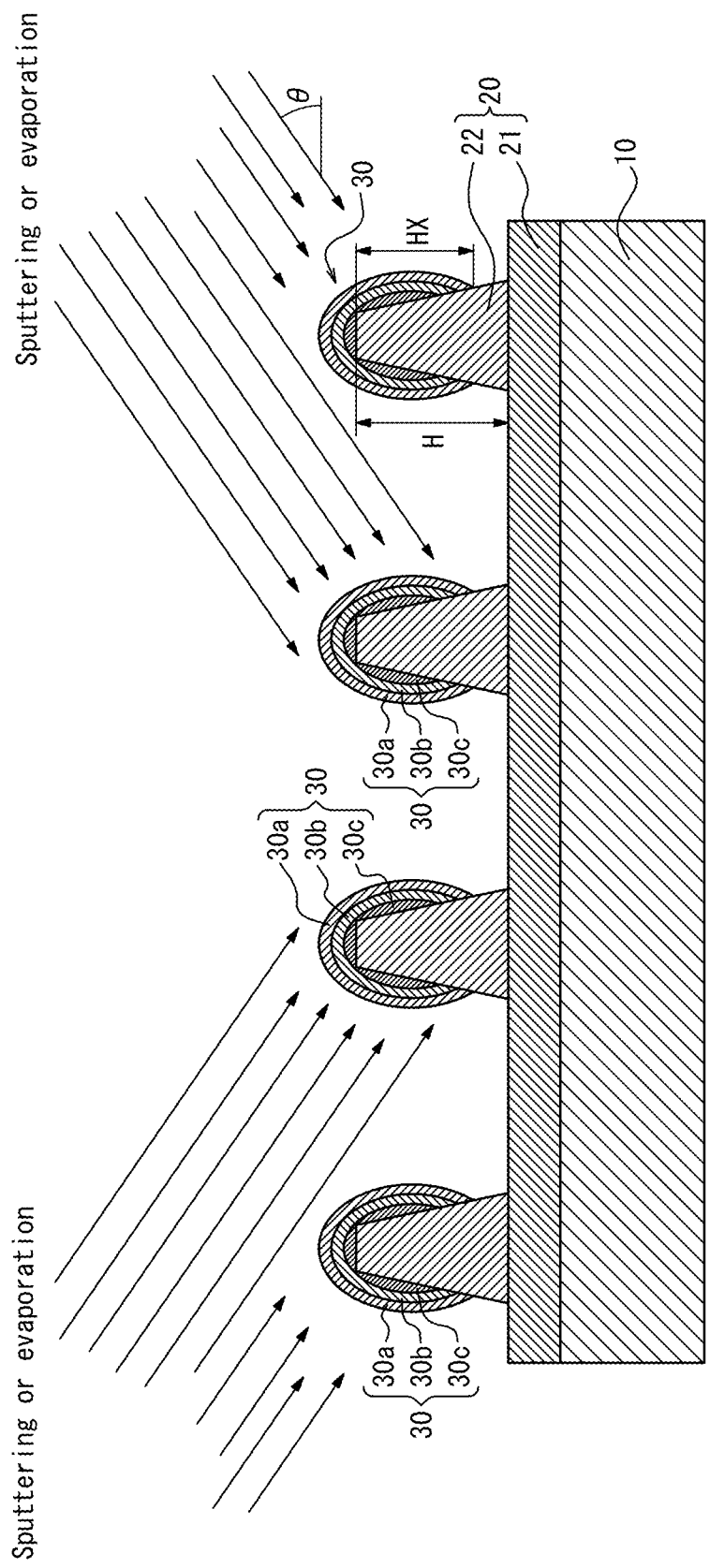
FIG. 26 is a cross-sectional view schematically illustrating one embodiment of a polarization element of the present disclosure.

The multilayer may have a dual-layered structure including the reflective layer and the absorptive layer, or may be a three-layered structure further including a dielectric layer 30b between the reflective layer 30a and the absorptive layer 30c as illustrated in FIG. 26.

In cases where the dielectric layer is provided, the dielectric layer is preferably formed to a thickness so that incident light is permitted to pass through the absorptive layer and the phase of polarized light reflected by the reflective layer is shifted by half the wavelength. The particular thickness is selected as appropriate within the range from 1 to 500 nm, so that the phase of polarization can be adjusted and the interference effect is enhanced.

The dielectric layer can be made of generally-used materials such as $SiO_2$, $Al_2O_3$, and $MgF_2$. The dielectric layer preferably has a refractive index of more than 1.0 and 2.5 or less. Because the optical properties of the absorptive layer are also affected by the refractive indices of surrounding materials, the polarization properties may be controlled by selection of the material of the dielectric layer.

Figure 3:
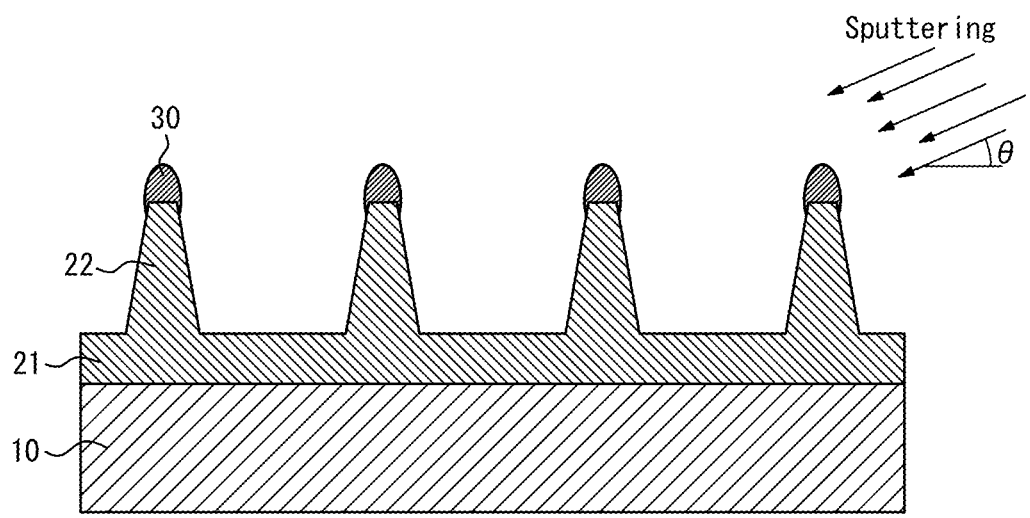
FIG. 3 is a cross-sectional view schematically illustrating one embodiment of the polarization element of the present disclosure.

As illustrated in FIG. 3, the optical functional layer 30 is preferably formed on at least ends of the protruding portions 22.

This is because formation of the optical functional layer 30 on the ends of the protruding portions 22 assures the above-described light reflection and light absorption effects to be manifested more reliably, to thereby enhance the polarization performance of the polarization element 1 as a whole.

The optical functional layer 30 is preferably not formed on the base portion 21, as illustrated in FIG. 3. This is because formation of the optical functional layer 30 on the base portion 21 may inhibit transmission of light, which may result in degradation of the polarization properties of the polarization element 1.

Here, in order to form the optical functional layer 30 on the ends of the protruding portions 22 without forming the optical functional layer 30 on the base portion 21 in the grid structural body 20, sputtering or vapor deposition is preferably carried out from an direction oblique to the protruding portions 22 of the grid structural body 20, as illustrated in FIG. 3. This enables the optical functional layer 30 to be formed only on the ends of the protruding portions 22. The angle θ of sputtering or vapor deposition for forming the optical functional layer 30 is specifically about 5 to 70° with respect to the surface of the substrate 10.

Formation of the optical functional layer 30 by sputtering or vapor deposition after formation of the grid structural body 20 made of a transparent material allows the layer forming conditions, the materials, and layer thicknesses to be readily modified. In addition, because the optical functional layer 30 being a multilayer can be easily provided, it is possible to design layers employing the interference effect by combining metals, semiconductors, and dielectrics. Unlike conventional art, no considerations on etchable combinations of materials are needed upon formation of the optical functional layer 30. This enables adjustments on the absorption ratio (attenuation amount) of polarized waves parallel to the grid structural body 20 and adjustments on the transmission ratio (transmission amount) of polarized wave perpendicular to the grid structural body 20. In addition, formation of the optical functional layer 30 after formation of the grid structural body 20 eliminates needs of apparatuses such as a vacuum dry etching apparatus, and needs of installation of safety apparatuses such as gas and detoxification apparatuses adapted to complex processes and etching materials. Thus, capital investment and running costs such as maintenance fees can be reduced to thereby achieve cost advantages.

As to the formation state of the optical functional layer 30, for example, as illustrated in FIG. 3, the optical functional layer 30 may be formed only on the ends of the protruding portions 22 of the grid structural body 20.

Figure 4:
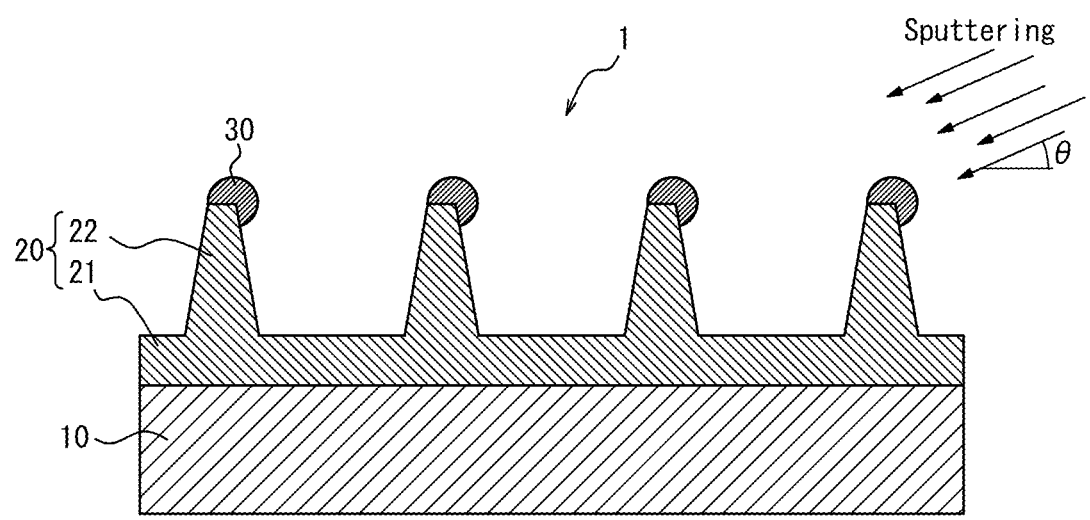
FIG. 4 is a cross-sectional view schematically illustrating one embodiment of the polarization element of the present disclosure.

Alternatively, as illustrated in FIG. 4, in cases where the optical functional layer 30 is formed by sputtering from an direction oblique to the protruding portions 22 of the grid structural body 20, the optical functional layer 30 protrudes from the ends of the protruding portions 22 in a large amount on the sputtering source side.

Figure 5:
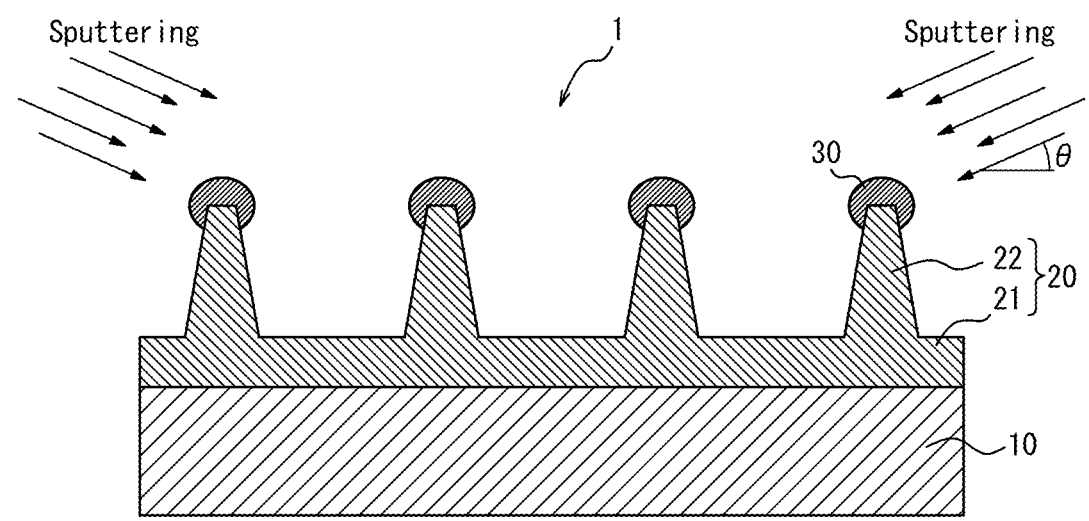
FIG. 5 is a cross-sectional view schematically illustrating one embodiment of the polarization element of the present disclosure.

Further alternatively, as illustrated in FIG. 5, the optical functional layer 30 can be formed such that the optical functional layer 30 protrudes so as to cover not only the ends but also a part of the sides of the protruding portions 22 of the grid structural body 20.

In view of achieving a better contrast, the optical functional layer 30 (30a, 30b, and 30c) is preferably formed on the ends and a part of the sides of the protruding portions 22 of the grid structural body 20, as illustrated in FIG. 5 and FIG. 26. The optical functional layer 30 covering not only the ends but also the sides of the protruding portions 22 enhances the absorptive performance and/or the reflection performance of the polarization element, thereby achieving a better contrast.

The formation condition of the optical functional layer 30 (30a, 30b, and 30c) may include sputtering or vapor deposition on the protruding portions 22 of the grid structural body 20 alternately from different directions 22, as illustrated in FIG. 26, for example, so that the optical functional layer 30 is formed on the ends and a part of the sides of the protruding portions 22 of the grid structural body 20.

In cases where the optical functional layer 30 is formed on the ends and the sides of the protruding portions 22, the optical functional layer 30 is preferably not formed on the base portion 21 of the grid structural body 20. This is to maintain an excellent transmission property. The optical functional layer 30 may be formed on only either sides of the protruding portions 22 in a cross-sectional view perpendicular to the absorption axis direction or reflection axis direction of the polarization element, as illustrated in FIG. 4. In view of achieving better polarization properties independent of the direction of incident light, however, the optical functional layer 30 is preferably formed so as to cover both sides of the protruding portions 22.

Further, the optical functional layer 30 (30a, 30b, and 30c) formed on a part of the sides of the protruding portions 22 is more preferably formed so as to cover in a range of 10% or more of the height H of the protruding portions 22 (namely, the height range HX of the coverage of the protruding portions by the optical functional layer/the height H of the protruding portions×100% 10%), as illustrated in FIG. 26. This is because the optical functional layer 30 (30a, 30b, and 30c) covering 10% or more of the height H of the protruding portions can achieve an even better contrast.

The thickness of the optical functional layer 30 is not particularly limited, and may be varied as appropriate according to the shape of the grid structural body 20 or the performances required for the optical functional layer 30.

For example, the optical functional layer 30 as an absorptive layer may have a thickness of 5 to 100 nm. Alternatively, the optical functional layer 30 as a reflective layer may have a thickness of 5 to 200 nm. Further alternatively, the optical functional layer 30 as a multilayer may have a thickness of 10 to 400 nm.

(Additional Member)

The first embodiment of the polarization element of the present disclosure may be further provided with members other than the substrate 10, the grid structural body 20, and the optical functional layer 30 described above.

Figure 6A:
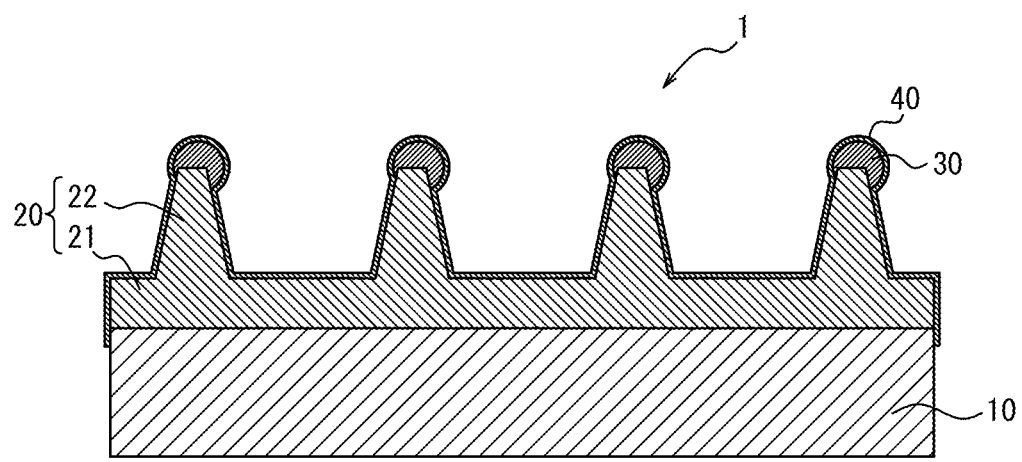
FIG. 6A is a cross-sectional view schematically illustrating one embodiment of the polarization element of the present disclosure.
Figure 6B:
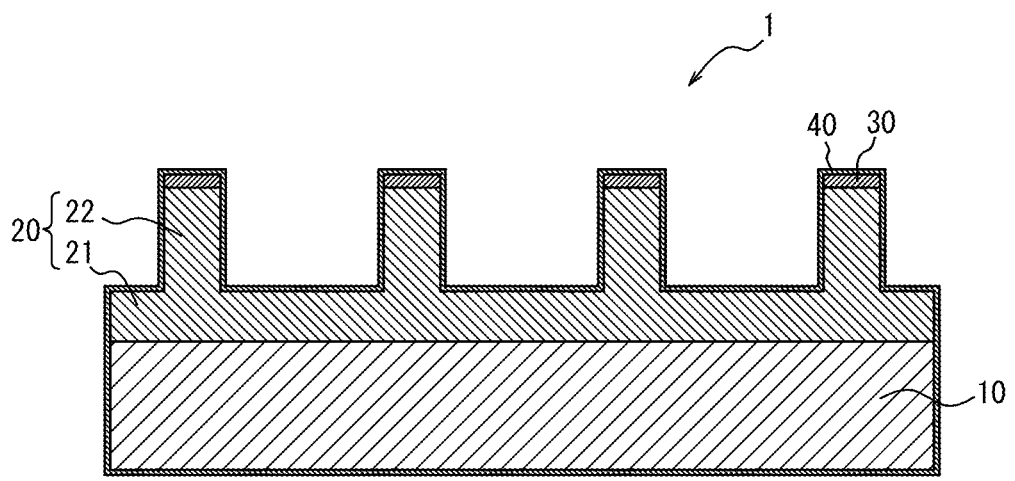
FIG. 6B is a cross-sectional view schematically illustrating another embodiment of the polarization element of the present disclosure.

For example, as illustrated in FIGS. 6A and 6B, in the first embodiment of the polarization element of the present disclosure, a protective layer 40 is preferably further provided so as to cover at least the surface of the optical functional layer 30.

Formation of the protective layer 40 can further enhance the scratch resistance, the stain resistance, and the water resistance of the polarization element.

Additionally, the protective layer 40 more preferably further includes a water-repellent coating and an oil-repellent coating This is because the stain resistance or the water resistance of the polarization element can be further improved.

The material of the protective layer 40 is not particularly limited as long as it is capable of enhancing the scratch resistance, the stain resistance, and the water resistance of the polarization element.

Examples thereof include a layer made of a dielectric material, specifically an inorganic oxide, and a silane-based water repellent material. Examples of the inorganic oxide include Si oxides and Hf oxides. The silane-based water repellent material may be a material containing a fluorinated silane compound such as perfluorodecyl triethoxysilane (FDTS), or a material containing a non-fluorinated silane compound such as octadecyl trichlorosilane (OTS).

Of these materials, at least one of the inorganic oxide and the fluorinated water repellent material as described above is preferably contained. Inclusion of the inorganic oxide to the protective layer 40 can further enhance the scratch resistance of the polarization element, whereas inclusion of the fluorine-based water-repellent material can further enhance the stain resistance and waterproofing properties of the polarization element.

It is sufficient that the protective layer 40 is formed so as to cover at least the surface of the optical functional layer 30, and the protective layer 40 is more preferably formed so as to cover the surfaces of the grid structural body 20 and the optical functional layer 30, as illustrated in FIG. 6A. Alternatively, as illustrated in FIG. 6B, the protective layer 40 may be formed so as to cover the entire polarization element 1.

Figure 7:
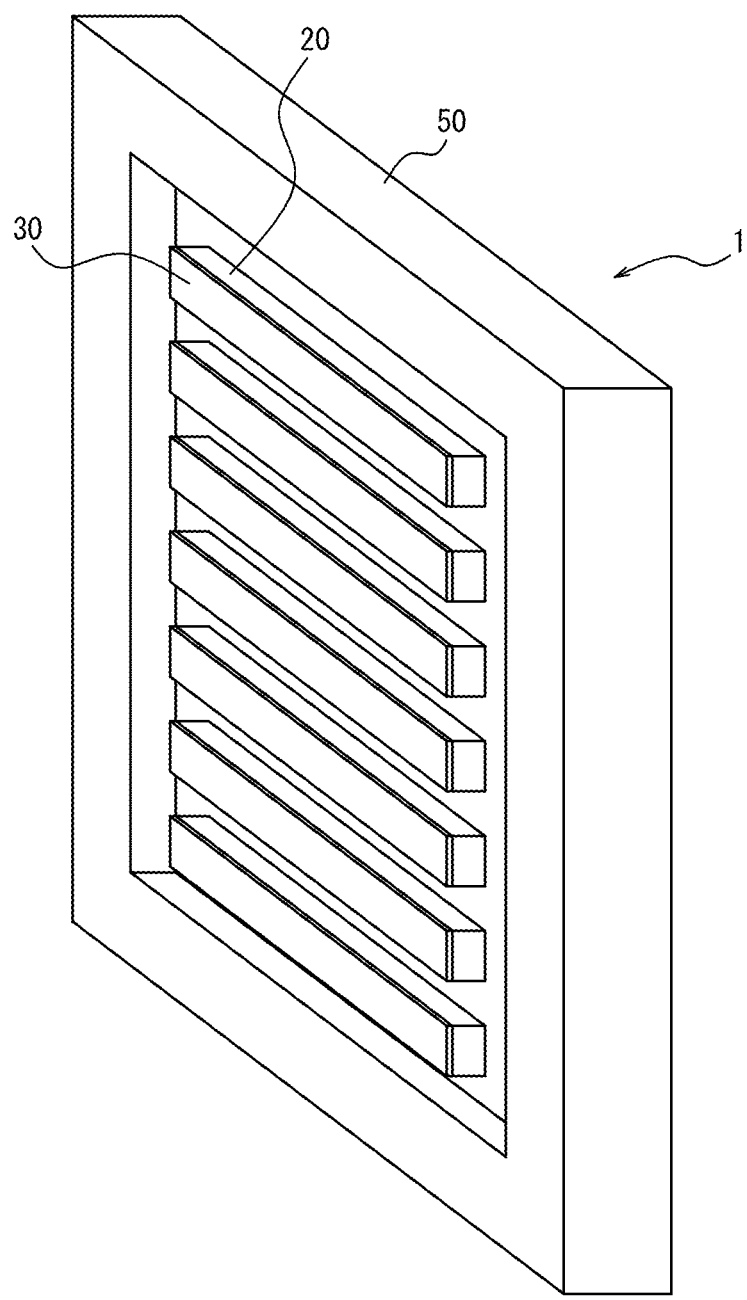
FIG. 7 is a perspective view illustrating one embodiment of the polarization element of the present disclosure.

Further, in the first embodiment of the polarization element of the present disclosure, as illustrated in FIG. 7, a heat dissipating member 50 is preferably provided so as to cover the substrate 10. This is because further efficient dissipation of heat from the substrate 10 is promoted.

Here, the heat dissipating member 50 is not particularly limited as long as it is a member having a high heat-dissipating effect. Examples of the heat dissipating member 50 include a heat sink, a heat spreader, a die pad, a heat pipe, a metal cover, and an enclosure.

Here, FIG. 8 is an image of a polarization element of the present disclosure which was actually fabricated, taken under magnification by a scanning electron microscope (SEM).

Figure 8A:
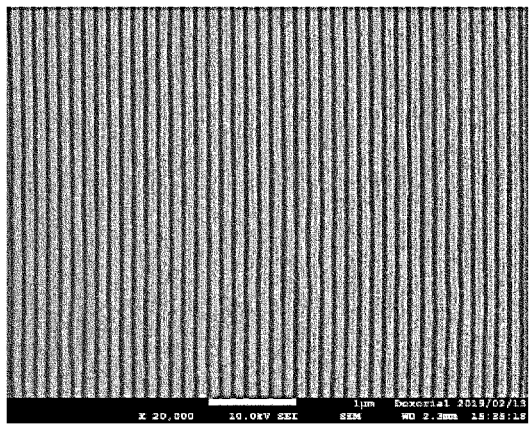
FIG. 8A is an observed top surface.
Figure 8B:
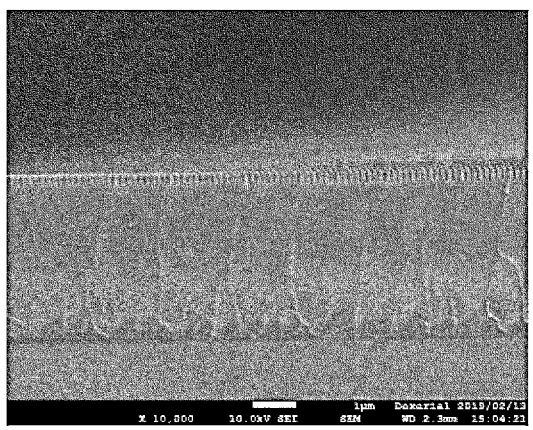
FIG. 8B is an observed cross-section.
Figure 8C:
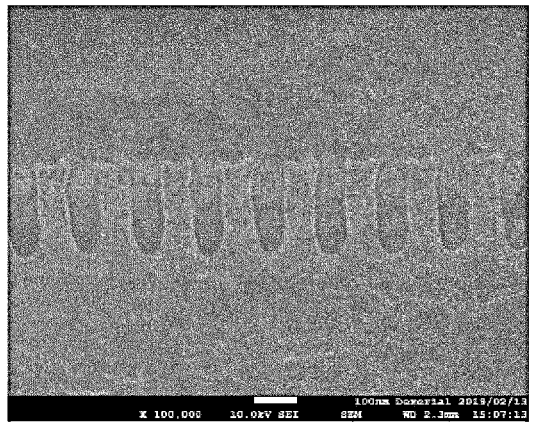
FIG. 8C is an image observed by magnifying FIG. 8B, and FIG. 8D an image observed by magnifying FIG. 8C.
Figure 8D:
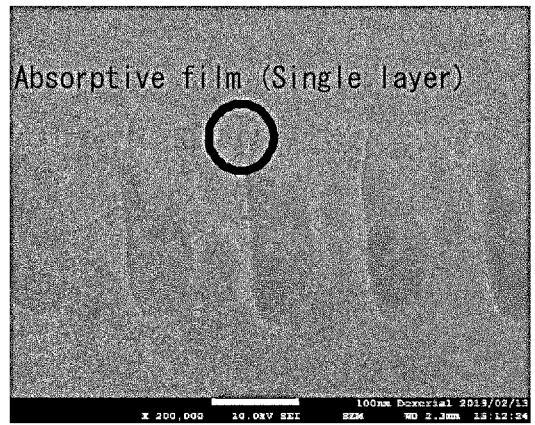

It can be observed from FIG. 8A that a grid structural body 20 having protruding portions 22 in a grid was formed on the substrate 10. Additionally, it was observed from FIGS. 8B and 8C that the grid structural body 20 had a base portion 21 provided along a surface of the substrate 10 and protruding portions 22 protruding from the base portion 21. Further, it can be observed from FIG. 8D that an optical functional layer 30 including an absorptive layer was formed on the ends of the protruding portions 22.

<Method of Manufacturing Polarization Element>

Next, a method of manufacturing a polarization element of the present disclosure will be described.

Figure 9A:
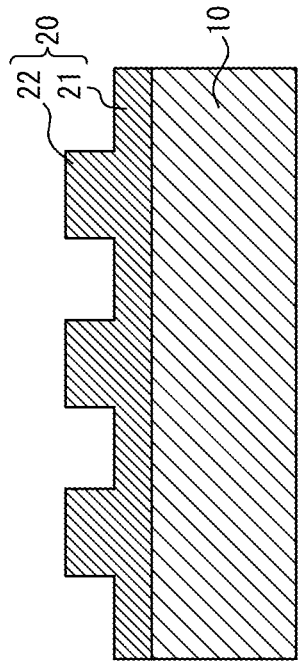
FIG. 9A illustrates the state where a grid structural body material is formed on a substrate.
Figure 9C:
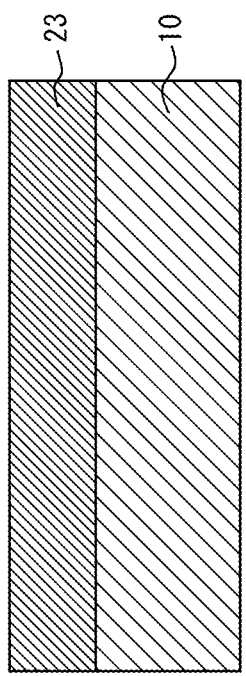
FIG. 9C illustrates the state where a grid structural body is formed on the substrate.
Figure 9B:
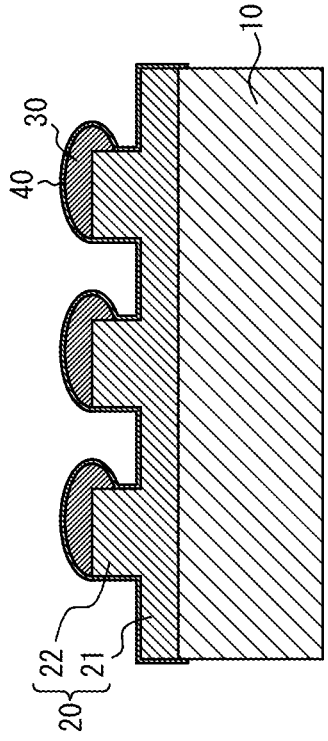
FIG. 9B illustrates the state where nanoimprinting is being applied to the grid structural body material.
Figure 9D:
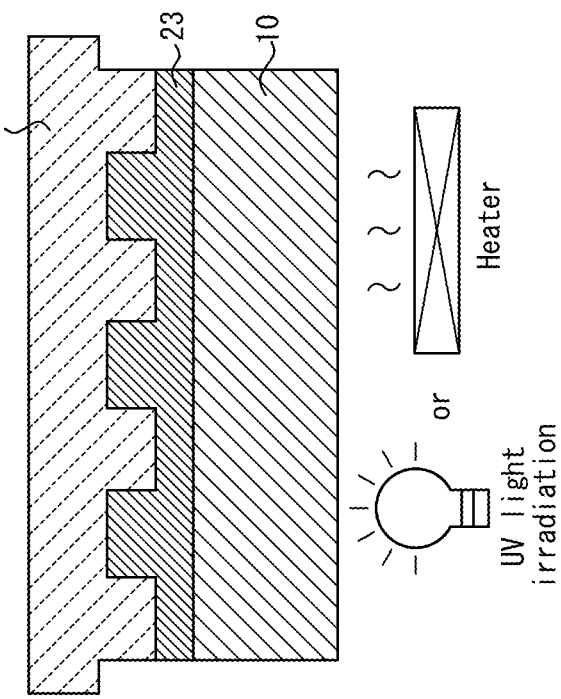
FIG. 9D illustrates the state where an optical functional layer is formed on protruding portions of the grid structural body and a protective layer has then been formed on the surface of the grid structural body and the optical functional layer.

As illustrated in FIGS. 9A to 9D, the method of manufacturing a polarization element of the present disclosure includes steps of: forming a grid structural body material 23 made of a transparent material on a substrate 10 made of an inorganic material (FIG. 9A);

forming, by applying nanoimprinting to the grid structural body material (FIG. 9B), a grid structural body 20 including a base portion 21 provided along a surface of the substrate 10 and protruding portions 22 protruding from the base portion 21 in a grid (FIG. 9C); and forming, on the protruding portions 22, an optical functional layer 30 including an absorptive layer for absorbing light, a reflective layer for reflecting light, or a multilayer having at least the absorptive layer and the reflective layer (FIG. 9D).

Through the above-described steps, it is possible to manufacture a polarization element 1 excellent in polarization properties and heat dissipation property without causing a significant cost increase and laboriousness in manufacturing.

Figure 10C:
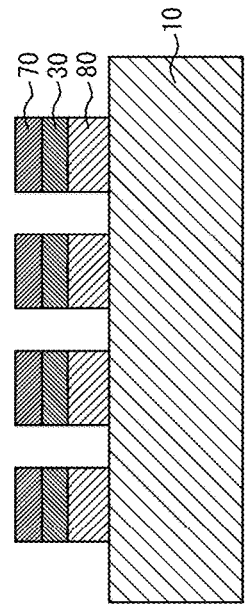
FIG. 10C illustrates the state after the metal material and the optical functional layer material are etched.
Figure 10D:
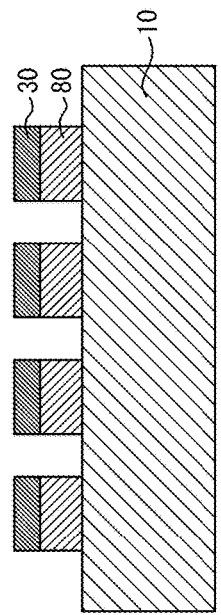
FIG. 10D illustrates the state after the resist mask is stripped away.
Figure 10E:
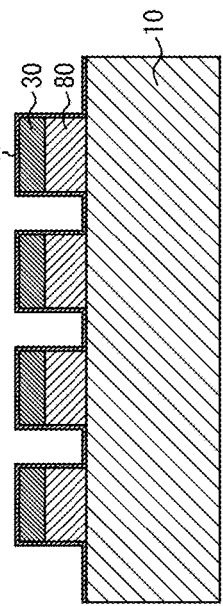
FIG. 10E illustrates the state where a protective layer is formed on the surface.
Figure 10A:
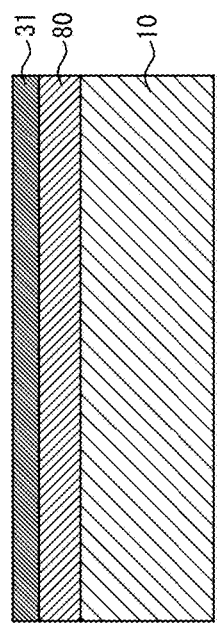
FIG. 10A illustrates the state where a metal material and an optical functional layer material are formed on a substrate.
Figure 10B:
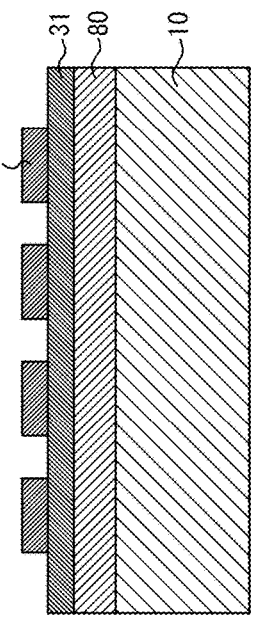
FIG. 10B illustrates the state where a resist mask is formed on the optical functional layer material.

In contrast, as illustrated in FIGS. 10A to 10E, in a conventional method of manufacturing a wire-grid polarization element, a layer 80 of a metal such as aluminum is deposited on a substrate 10 made of an inorganic material such as glass by sputtering or vapor deposition for fabricating projecting grid shapes. Thereafter, an optical functional layer material layer 31 made of a material for absorbing light in the usage band or the like is deposited on the metal layer 80 by sputtering or vapor deposition (FIG. 10A). A resist mask 70 is then patterned using the photolithography technique (FIG. 10B). Thereafter, the optical functional layer material layer 31 and the metal layer 80 are etched using a vacuum dry etching apparatus or the like, to form projecting shapes made of the metal layer 80 and the optical functional layer 30 (FIG. 10C). For example, in cases where the etching selectivity ratio is insufficient between the resist mask 70 and the optical functional layer material layer 31/metal layer 80 in this step, an oxide layer such as $SiO_2$ is further deposited on the optical functional layer material layer 31 by sputtering or the like, followed by formation of the resist mask 70 on this layer by the photolithography technique. Then, after the resist mask 70 is stripped away (FIG. 10D), an $SiO_2$ layer or the like as a protective layer 40 is deposited by CVD or the like and a water-or oil-repellent coating treatment is additionally carried out where necessary.

The process for fabricating an absorptive wire-grid polarization element having a typical configuration are illustrated in FIGS. 10A to 10E. In cases where a dielectric layer such as one made of $SiO_2$ is provided between the metal layer and the absorptive layer or the absorptive layer or the absorptive layer is a multilayer, however, a more complicated process is required. Therefore, the costs and time involved in manufacturing are considered to be increased, which makes conventional wire-grid polarization elements fabricated by the process as illustrated in FIGS. 10A to 10E expensive. In addition, upon mass-production of polarization elements, formation of projecting shapes smaller than the wavelengths of light would require installation of expensive high-precision etching and photolithography apparatuses in numbers to meet the production volume, and capital investment is expected to be further increased.

The substrate 10 made of an inorganic material used in the method of manufacturing a polarization element of the present disclosure may be one similar to the substrate 10 described above with regard to the polarization element of the present disclosure.

Additionally, in the method of manufacturing a polarization element of the present disclosure, the grid structural body material 23 formed on the substrate 10 may be a one similar to the material used in the grid structural body 20 described above in the polarization element of the present disclosure.

Further, the thickness of the grid structural body material 23 can be adjusted appropriately according to the dimensions of the base portion 21 and the protruding portions 22 of the grid structural body 20 formed by nanoimprinting.

In the method of manufacturing a polarization element of the present disclosure, nanoimprinting is applied to the grid structural body material 23 (FIG. 9B), and the conditions of the nanoimprinting are not particularly limited.

For example, as illustrated in FIG. 9B, while nanoimprinting is applied using a replica master (or an original master), the grid structural body material 23 which is being imprinted is cured by UV light irradiation, heating, or the like, followed by release of the replica master. This enables formation of the grid structural body 20 having the base portion 21 and the protruding portions 22 formed therein through transcription.

Note that the master used for the nanoimprinting can be fabricated by the photolithography technique, for example, as illustrated in FIGS. 11A to 11E.

Figure 11C:
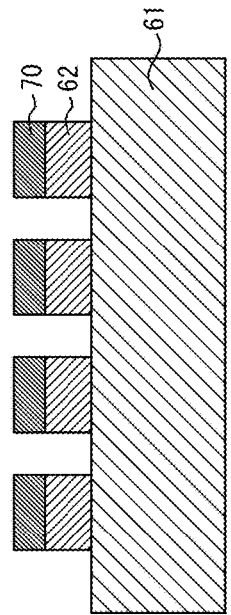
FIG. 11C illustrates the state after the metal material is etched.
Figure 11D:
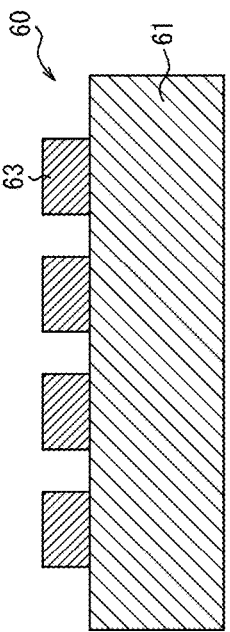
FIG. 11D illustrates the state after the resist mask is stripped away.
Figure 11E:
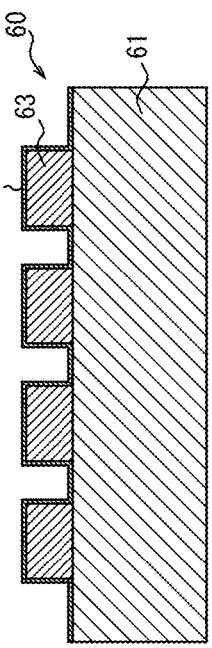
FIG. 11E illustrates the state where a mold release coating is formed on the surface of the resulting mold.
Figure 11A:
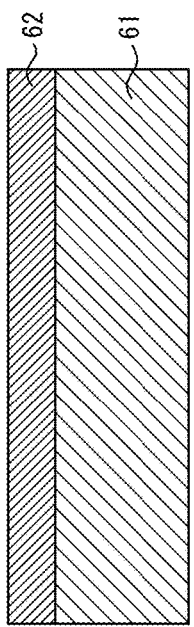
FIG. 11A illustrates the state where a metal material is formed on a substrate.
Figure 11B:
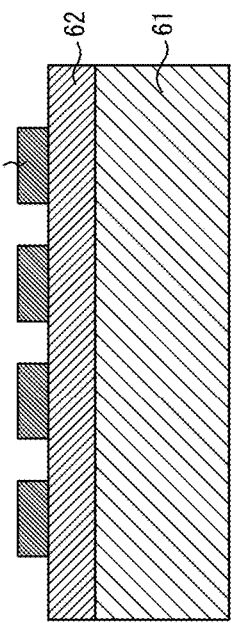
FIG. 11B illustrates the state where a resist mask is formed on the metal material.

First, after a master metal layer 62 is deposited on a master base material 61 (FIG. 11A), a resist mask 70 is formed (FIG. 11B). The master metal layer 62 is then etched (FIG. 11C). After the etching, the resist mask 70 is stripped away to obtain a master 60 including the master base material 61 and master projecting portions 63 (FIG. 11D).

Note that the master 60 may further include a release layer coating 64 if necessary (FIG. 11E). Provision of the release layer coating 64 further facilitates release of the master after application of nanoimprinting to the grid structural body material 23 (FIG. 9B).

Further, in the method of manufacturing a polarization element of the present disclosure, the optical functional layer 30 formed on the protruding portions 22 may have conditions similar to the conditions of the optical functional layer 30 described in the above-mentioned polarization element of the present disclosure.

Note that, as illustrated in FIG. 9D, the method of manufacturing a polarization element of the present disclosure may further include, if necessary, forming a protective layer 40 so as to cover the surfaces of the grid structural body 20 and the optical functional layer 30.

The protective layer may have conditions similar to the conditions of the protective layer 40 described in the above-mentioned polarization element of the present disclosure.

<Head-Up Display Apparatus>

Next, one embodiment of a head-up display apparatus of the present disclosure will be described.

Figure 12:
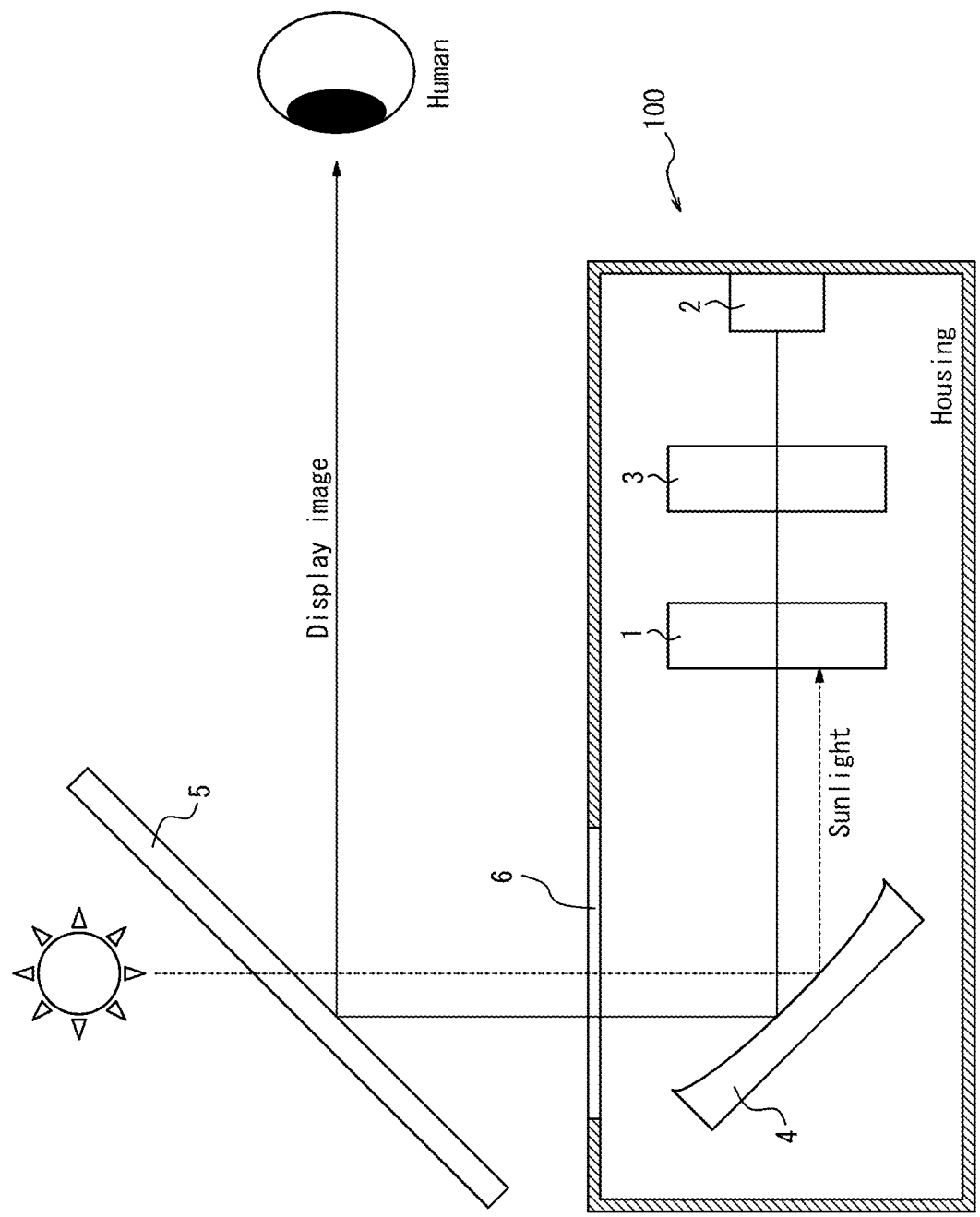
FIG. 12 is a cross-sectional view schematically illustrating one embodiment of a head-up display apparatus of the present disclosure.

As illustrated in FIG. 12, an embodiment 100 of a head-up display apparatus of the present disclosure includes the polarization element 1 of the present disclosure described above.

The head-up display apparatus 100 provided with the polarization element 1 of the present disclosure can have improved polarization properties and improved heat resistance. Because head-up displays having conventional polarization element disposed therein have inferior heat dissipation property, the heat resistances thereof are considered to be insufficiently in view of long-term use and their future extensions to high-brightness large displays.

In the embodiment 100 of the head-up display apparatus of the present disclosure, there is no particular limitation on the location where the polarization element 1 is disposed. For example, as illustrated in FIG. 12, the head-up display apparatus may include a light source 2, a display element 3 for emitting a display image, and a reflector 4 for reflecting the display image toward a display surface 5, wherein the polarization element 1 may be disposed between the display element 3 and the reflector 4.

The polarization element 1 of the present disclosure used as a pre-polarizing plate disposed in front of the display element 3 inhibits incidence of sunlight into the display element 3 while permitting the display image emitted from the display element 3 to pass through. As a result, the heat resistance and the durability of the head-up display can be further improved.

In the embodiment 100 of the head-up display apparatus of the present disclosure, as illustrated in FIG. 12, the display element 3 is, for example, a transmissive liquid crystal panel in which a liquid crystal is filled between a pair of substrates transparent to light in the usage band, and respective polarization elements not illustrated in the figure are laminated in front and back of the liquid crystal panel. The polarization axes of the polarization elements laminated in front and back are orthogonal to each other. The light source 2, such as an LED, is disposed behind the display element 3 (on the side opposite to the direction of emission of a display image), so that the display image is emitted when the display element 3 is illuminated.

The polarization element 1 on the front side of the display element 3 (in front of the display element 3 relative to the direction of emission of a display image) is disposed such that that polarization axis thereof coincides with the polarization axis of the polarization element laminated on the front side of the display element 3, so that a display image emitted from the display element 3 is permitted to pass through. The display image passing through the polarization element 1 is reflected by a mirror (reflector 4) disposed at an angle of about 45° relative to the display element 3, and is then incident onto the surface of a windshield (display surface 5), so that the display image is visible to the driver (human) as an imaginary image. These members configuring the head-up display apparatus are accommodated in a housing.

Figure 13:
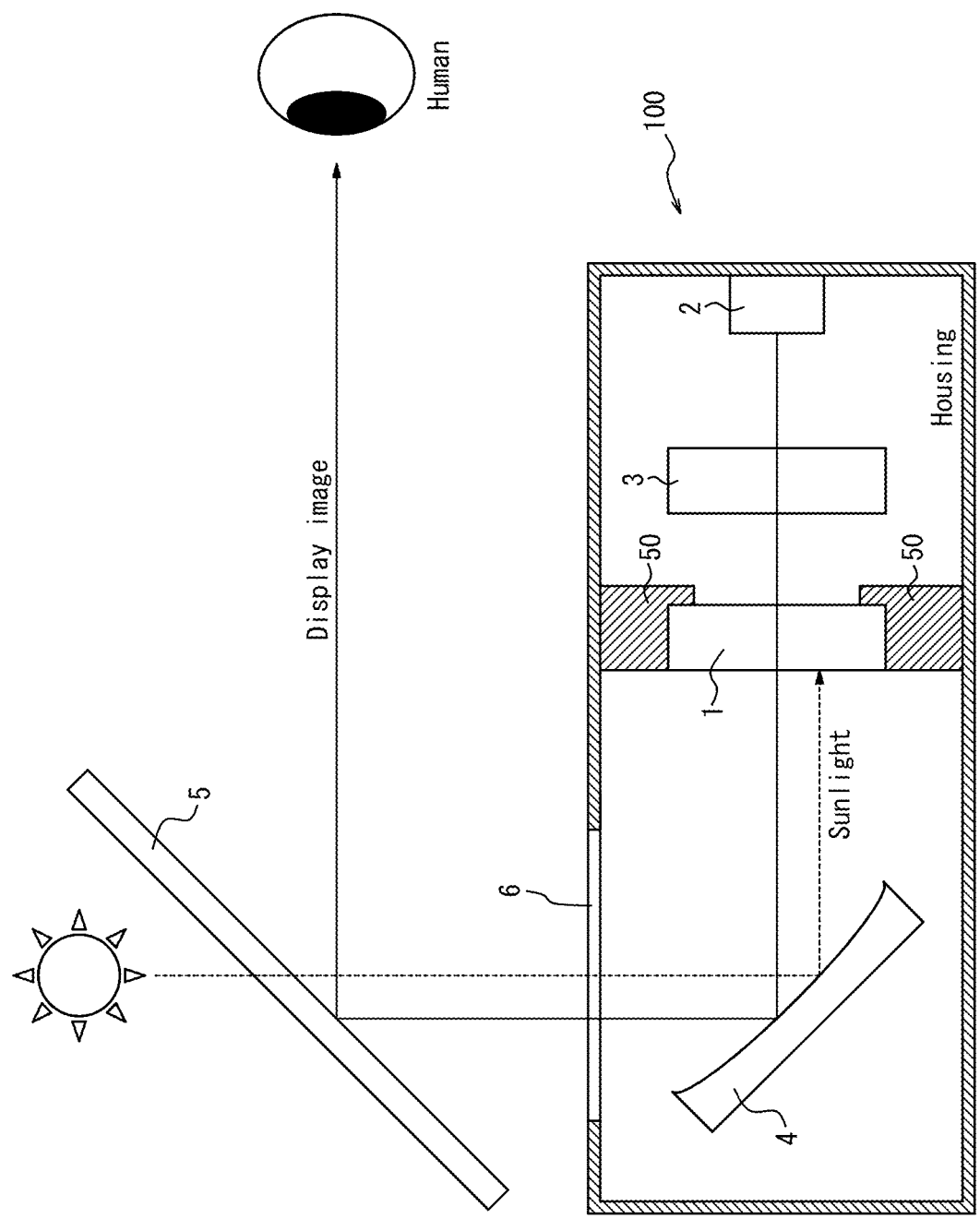
FIG. 13 is a cross-sectional view schematically illustrating another embodiment of a head-up display apparatus of the present disclosure.

Further, as illustrated in FIG. 13, in the embodiment 100 of the head-up display apparatus of the present disclosure, a heat dissipating member 50 is preferably provided around the polarization element 1. This promotes even further efficient dissipation of heat the polarization element 1, to thereby further improve the heat resistance of the apparatus.

Here, the heat dissipating member 50 is similar to the heat dissipating member 50 described in the above-mentioned polarization element 1 of the present disclosure.

The configurations of the head-up display apparatus 100 illustrated in FIGS. 12 and 13 are minimum and basic configurations. The members configuring the head-up display apparatus of the present disclosure are not limited to the ones in FIGS. 12 and 13, and the head-up display apparatus may include additional members as appropriate according to the required performances and the like.

Additionally, in the head-up display apparatus of the present disclosure, the location where the polarization element 1 is disposed is not particularly limited as described above, and may be selected as appropriate according to the configuration and the performances required for the head-up display apparatus.

For example, although not illustrated in the drawings, the polarization element 1 may be provided between the display element 3 and the light source 2.

Alternatively, although not illustrated in the drawings, the polarization element 1 may be integrated into the reflector 4.

Further alternatively, a cover portion 6 provided in the head-up display apparatus can be configured from the polarization element 1.

EXAMPLES

The present disclosure will now be described in detail with reference to examples. However, the present disclosure is not limited in any way to the following examples.

Example 1

Models of a polarization element 1 as illustrated in FIG. 6B were created. Each model of the polarization element 1 included a substrate 10 made of glass, a grid structural body 20 which was made of a UV curable resin (acrylic resin) and included a base portion 21 provided along a surface of the substrate 10 and protruding portions 22 protruding from the base portion 21 in a grid, an optical functional layer 30 including an absorptive layer of Ge for absorbing light formed on the protruding portions 22, and a protective layer 40 made of $SiO_2$.

Upon creating the models of the polarization element 1, the conditions of the grid structural body 20 or the optical functional layer 30 were varied as described in the following (1) to (9). The optical properties (the transmittance along the transmission axis Tp, the transmittance along the absorption axis Ts, the reflectance along the transmission axis Rp, the reflectance along the absorption axis Rs, and the contrast CR) to light in wavelengths of 430 to 680 nm were evaluated.

The optical properties of the created models were verified by electromagnetic field simulations employing the rigorous coupled wave analysis (RCWA) technique. For the simulations, a grating simulator Gsolver available from Grating Solver Development Co. was used.

(1) Material of grid structural body

The average values of the optical properties (Tp, Rp, Ts, Rs, and CR) of the models of the polarization element 1 for wavelengths of 430 to 680 nm were plotted for comparisons of the material of the grid structural body 20 between $SiO_2$ made of SOG and polymethyl methacrylate resin (PMMA), which was a UV curable resin. The comparison results are presented in FIG. 14.

Figure 14:
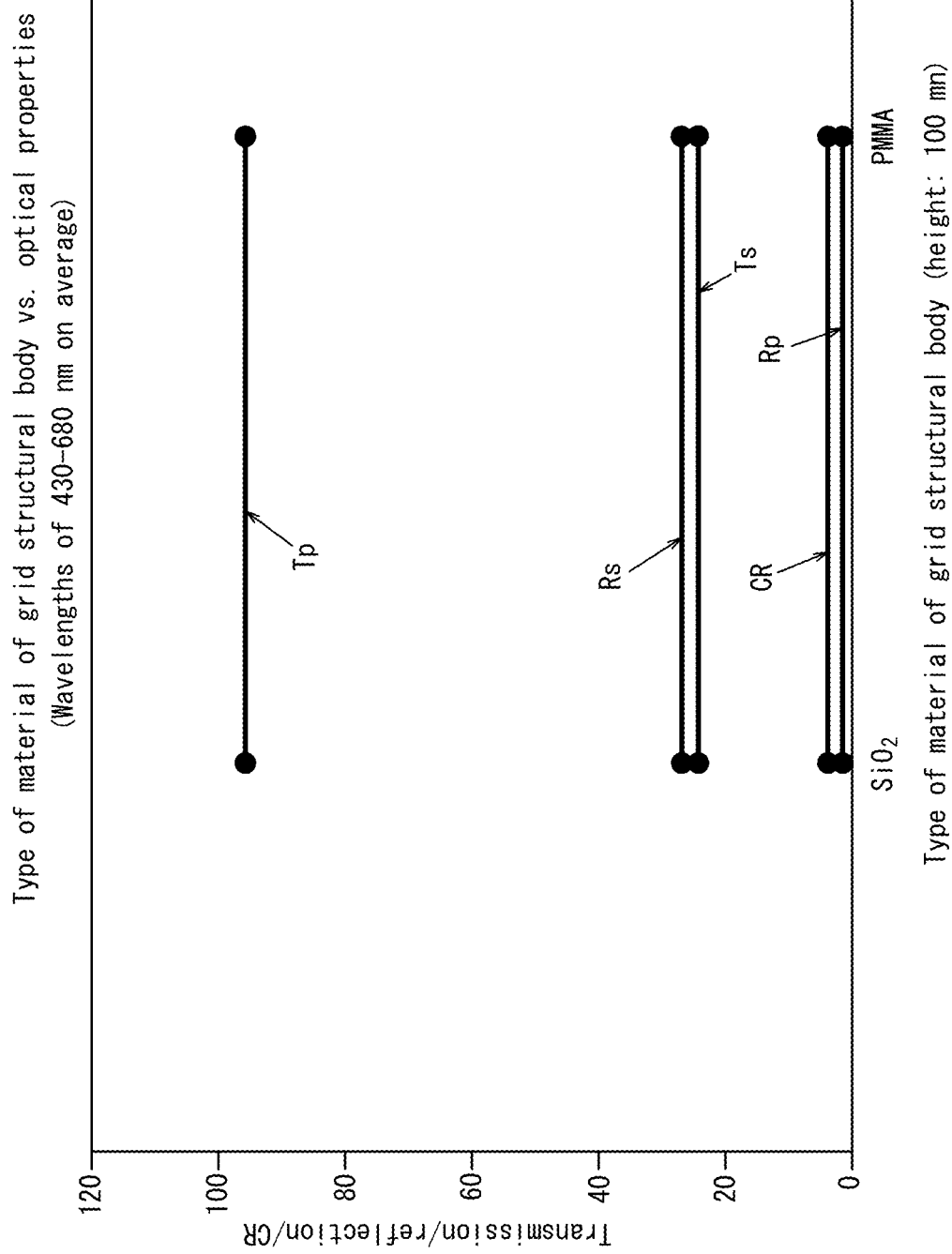
FIG. 14 is a graph for comparing the optical properties between different materials of the grid structural body in Example 2.

From the results in FIG. 14, it was confirmed that the same properties were obtained irrespective of whether the grid structural body 20 was made of $SiO_2$ or PMMA. These results demonstrated that formation of the grid structural body 20 from a material transparent to light in the usage band provides similar characteristics irrespective of whether the material is an inorganic material or an organic material. This therefore allows for selection of an appropriate material in view of the required characteristics, the reliability, and the mass productivity.

(2) Thickness of Base Portion of Grid Structural Body

Figure 15:
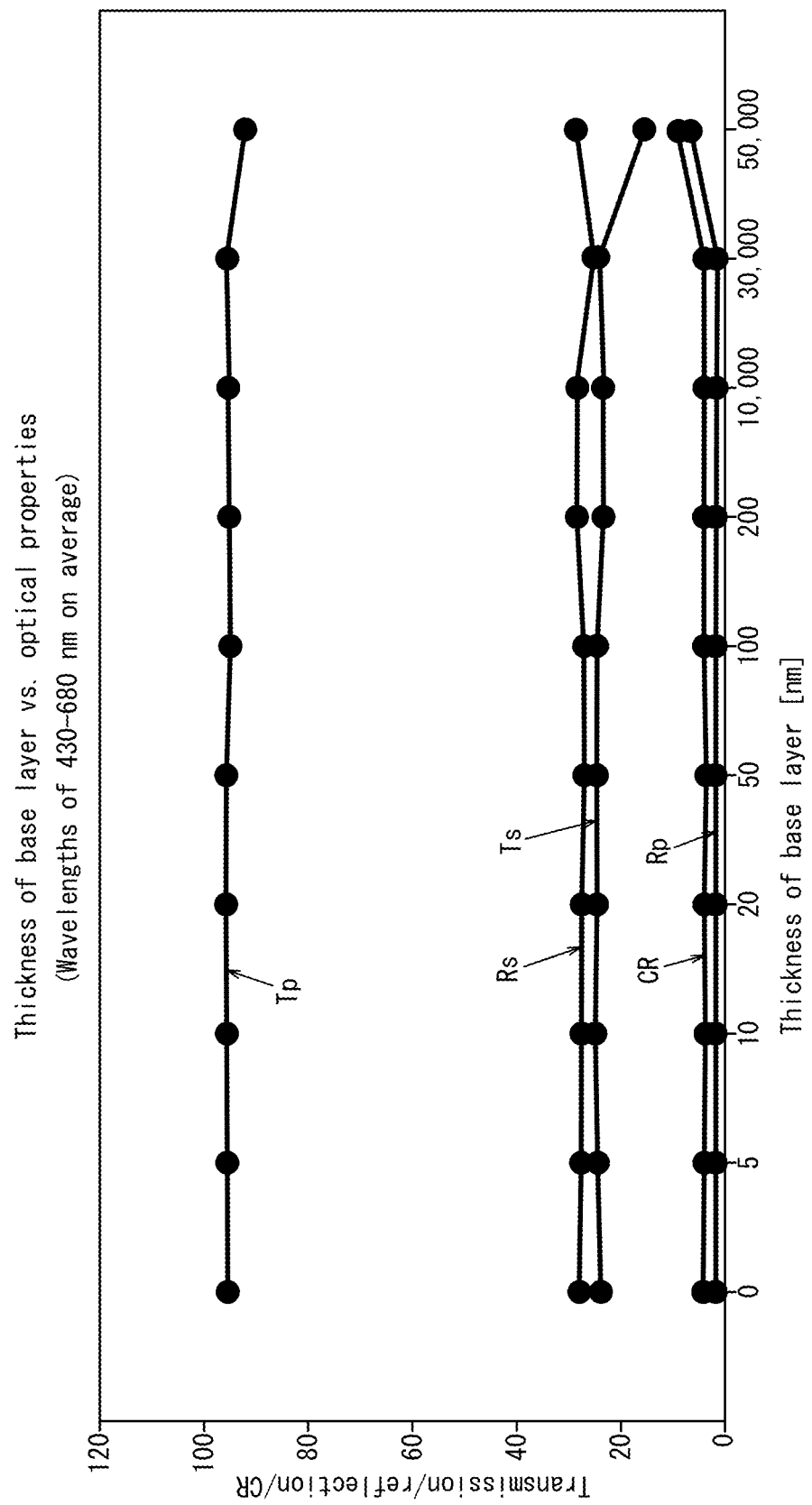
FIG. 15 is a graph for comparing the optical properties when the thickness of the base portion of the grid structural body was varied in Example 2.

The average values of the optical properties (Tp, Rp, Ts, Rs, and CR) of the models of the polarization element 1 for wavelengths of 430 to 680 nm were plotted for comparisons when the thickness TB of the base portion 21 of the grid structural body 20 was varied. The comparison results are presented in FIG. 15.

The thickness TB of the base portion 21 was varied from 0 nm to 30000 nm at regular intervals. From the results in FIG. 15, it was confirmed that the thickness of the base portion 21 had little effect on the polarization properties. It was also found, however, that the characteristics Tp and Ts deviate when the thickness of the base portion 21 exceeded 30000 nm (30 μm). These results demonstrated that the thickness of the base portion 21 can be adjusted appropriately within a certain range according to the reliability including the adhesiveness, and that a strict process control, such as control on the base layer in the mass production process is not required, which is advantageous in terms of the costs.

(3) Height of Protruding Portions of Grid Structural Body

Figure 16:
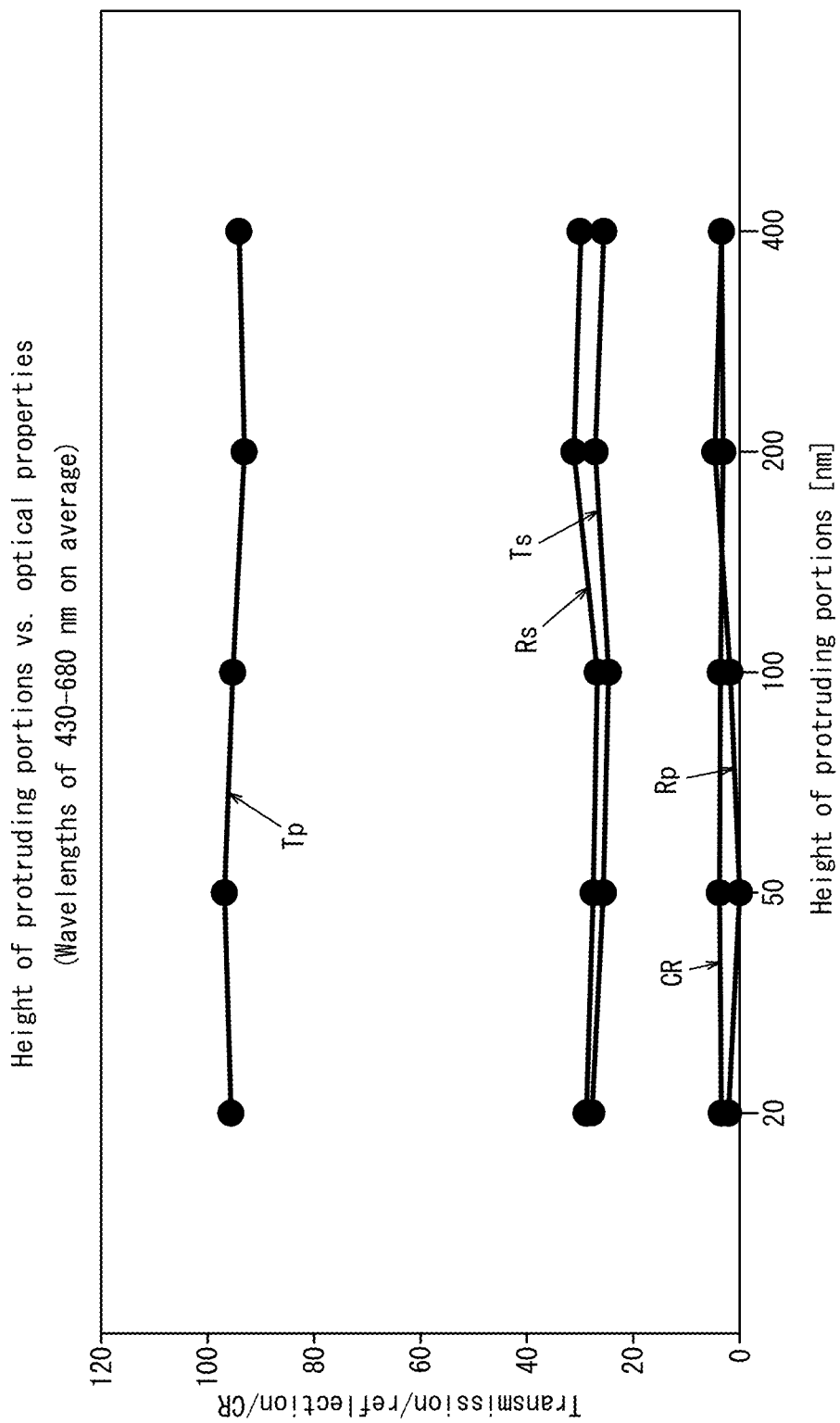
FIG. 16 is a graph for comparing the optical properties when the height of the protruding portions of the grid structural body was varied in Example 2.

The average values of the optical properties (Tp, Rp, Ts, Rs, and CR) of the models of the polarization element 1 for wavelengths of 430 to 680 nm were plotted for comparisons when the height H of the protruding portions 22 of the grid structural body 20 protruding from the base portion 21 was varied. The comparison results are presented in FIG. 16.

The height of the protruding portions 22 was varied from 20 nm to 400 nm at a predetermined interval. From the results in FIG. 16, it was confirmed that the heights had almost no effect on the polarization properties. These results demonstrated that formation of the protruding portions 22 from a material transparent to light in the usage band eliminates the need for strict process control, such as control on the height H of the protruding portions 22, and that the protruding portions 22 having a smaller height H are easier to fabricate in view of mass productivity and have greater advantages in terms of the yield and the reliability.

(4) Thickness of Absorptive Layer

The average values of the optical properties (Tp, Rp, Ts, Rs, and CR) of the models of the polarization element 1 for wavelengths of 430 to 680 nm were plotted for comparisons when the thickness of the absorptive layer as the optical functional layer 30 (thickness of the thickest portion of the absorptive layer adhered to the protruding portions 22) was varied. The comparison results are presented in FIG. 17.

Figure 17:
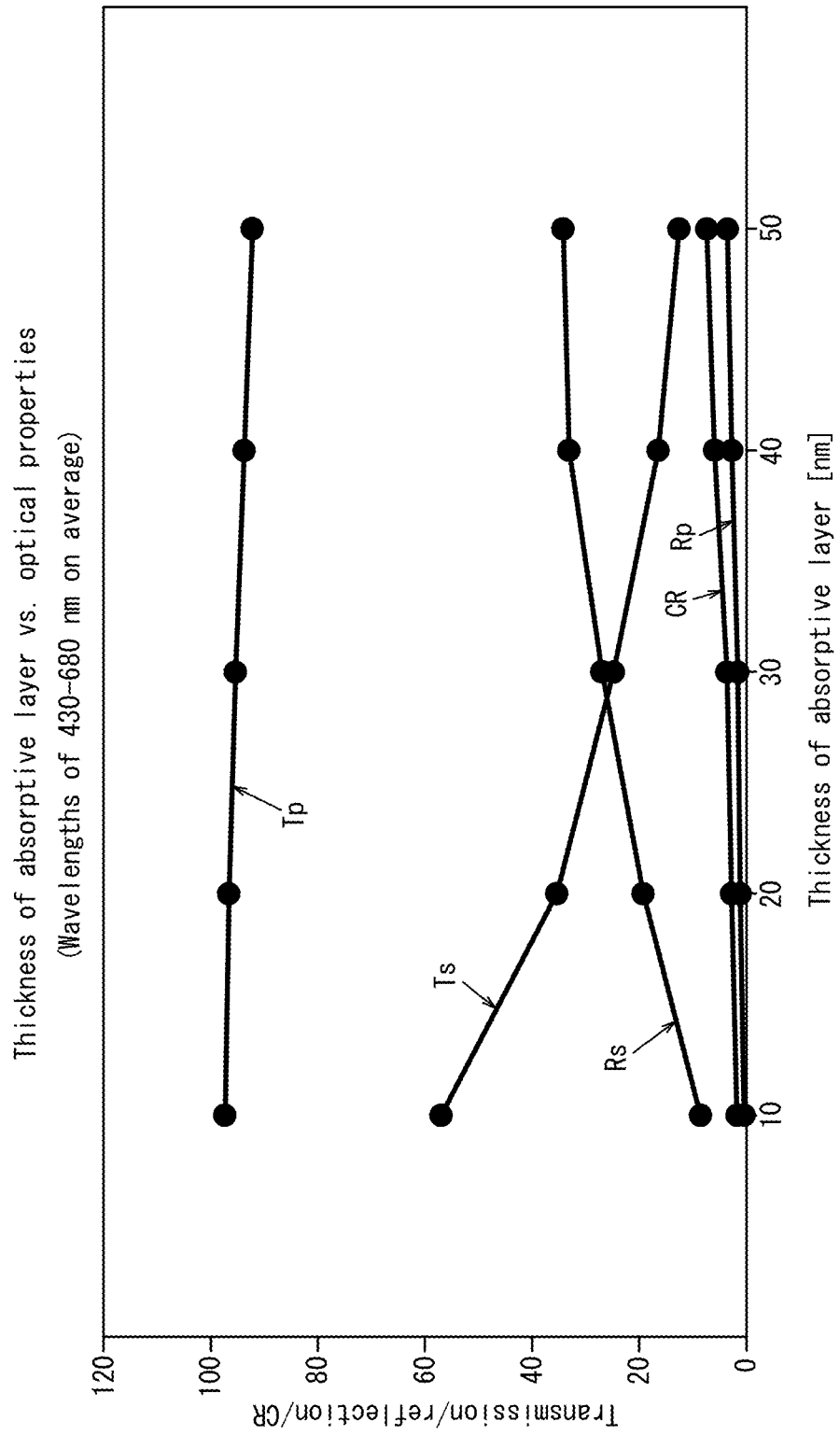
FIG. 17 is a graph for comparing the optical properties when the thickness of the absorptive layer formed on the protruding portions was varied in Example 2.

From the results plotted in FIG. 17, it was confirmed that the polarization properties changed when the thickness of the absorptive layer was varied from 10 nm to 50 nm at a predetermined interval. This therefore indicated that formation of the grid structural body 20 from a material transparent to light in the usage band, followed by deposition of an absorptive layer while controlling the thickness of the absorptive layer allows for a control on the optical properties, in particular, Rs and Ts, thereby allowing for optimization of the polarization properties to meet customers' needs by through a control only on the thickness of the absorptive layer.

(5) Material of Absorptive Layer

The average values of the optical properties (Tp, Rp, Ts, Rs, and CR) of the models of the polarization element 1 for wavelengths of 430 to 680 nm were plotted for comparisons of the material of the absorptive layer as the optical functional layer 30 between Ge and FeSi. The comparison results are presented in FIG. 18.

Figure 18:
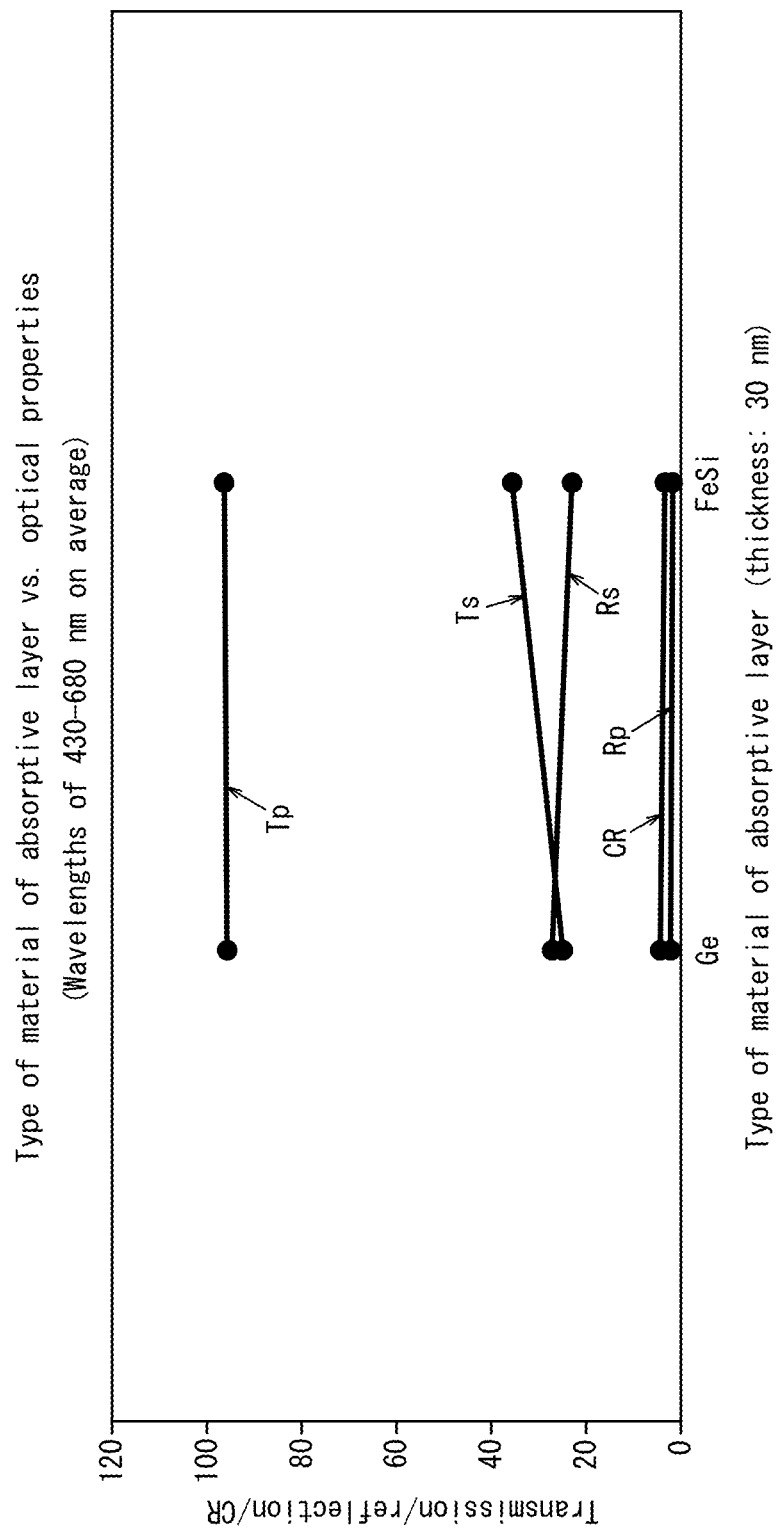
FIG. 18 is a graph for comparing the optical properties between different materials of the absorptive layer formed on the protruding portions in Example 2.

From the results in FIG. 18, it was confirmed that the polarization properties changed when the different materials were used for the absorptive layer. This therefore indicated that formation of the grid structural body 20 from a material transparent to light in the usage band, followed by deposition of an absorptive layer by changing the material of this absorptive layer allows for a control on the optical properties, in particular, Rs and Ts, thereby allowing for optimization of the polarization properties to meet customers' needs through selection of the material of the absorptive layer. It can also be considered that a multilayered structure made of a combination of a metal, a semiconductor, and a dielectric can take advantage of the interference effect to further optimize the polarization properties.

(6) Width of Absorptive Layer

The average values of the optical properties (Tp, Rp, Ts, Rs, and CR) of the models of the polarization element 1 were plotted for comparisons when the width parallel to the transmission axis of incident light (i.e., the width in the direction orthogonal to the longitudinal direction of the grid structural body) of the optical functional layer 30 formed on each protruding portion 21 of the grid structural body 20 was varied. The comparison results are presented in FIG. 19.

Figure 19:
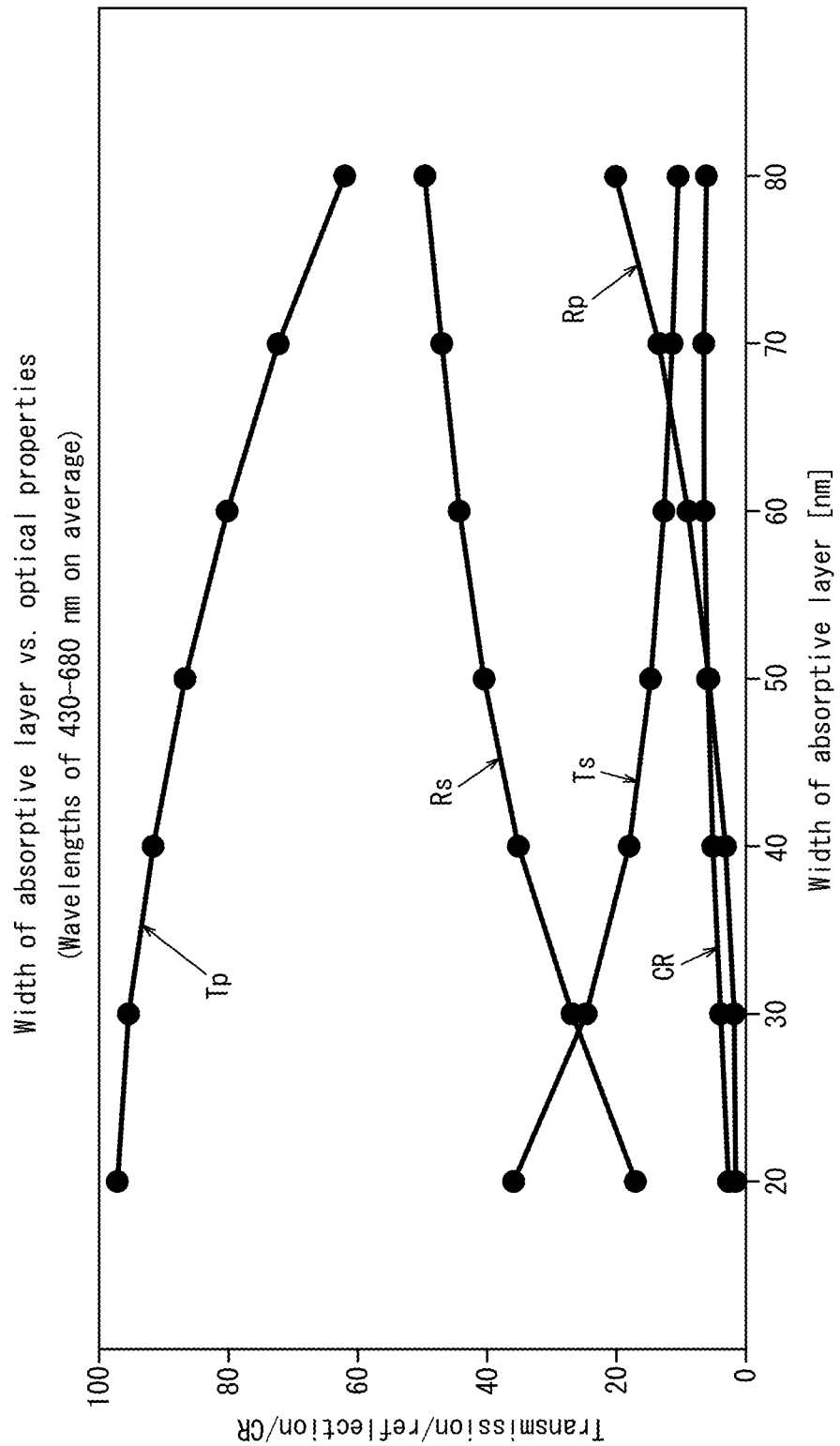
FIG. 19 is a graph for comparing the optical properties when the width of the absorptive layer formed on the protruding portions was varied in Example 2.

From the results plotted in FIG. 19, it was confirmed that the polarization properties changed when the width of the absorptive layer was varied. This therefore indicated that formation of the grid structural body 20 from a material transparent to light in the usage band, followed by deposition of an absorptive layer by changing the width of the deposited layer of the absorptive layer allows for a control on the optical properties, in particular, Rs, Rp, and Tp, thereby allowing for optimization of the polarization properties to meet customers' needs through selection of the material of the absorptive layer.

(7) Formation State of Absorptive Layer

The average values of the optical properties (Tp, Rp, Ts, Rs, and CR) of the models of the polarization element 1 were plotted for comparisons when the formation state of the absorptive layer was varied among the case where the absorptive layer was formed only on the ends of the protruding portions 22 as illustrated in FIG. 3, the case where the absorptive layer was formed thickly on either sides of the ends of the protruding portions 22 as illustrated in FIG. 4, and the case where the absorptive layer was formed thickly on both sides of the ends of the protruding portions 22 as illustrated in FIG. 5. The comparison results are presented in FIG. 20.

Figure 20:
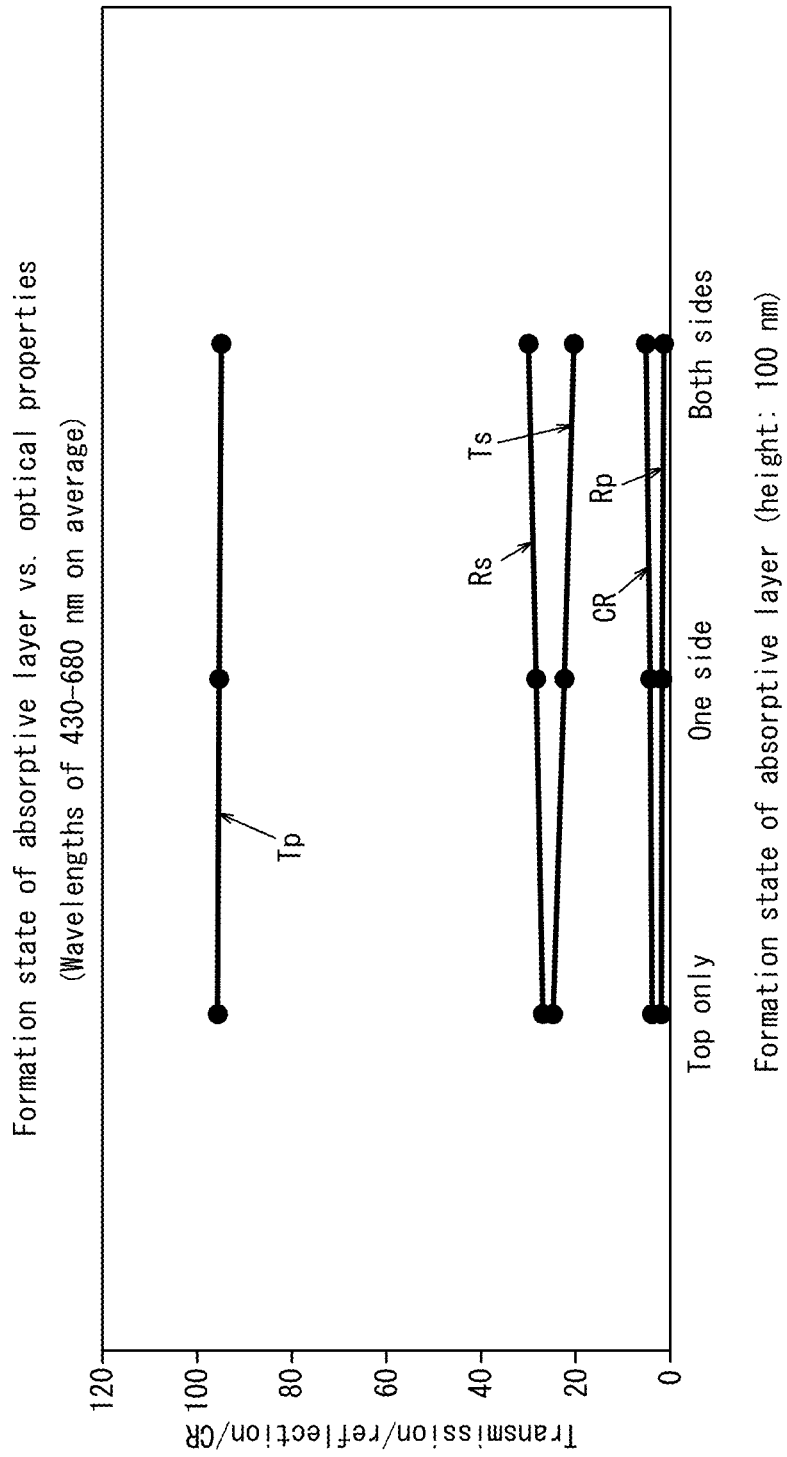
FIG. 20 is a graph for comparing the optical properties when the formation state of the absorptive layer formed on the protruding portions was varied in the example.

From the results plotted in FIG. 20, it was confirmed that the polarization properties changed when the manner how the absorptive layer was adhered to each protruding portion 21 of the grid structural body 20 was changed. This therefore indicated that modification of the angle $\theta$ of the oblique sputtering and/or sputtering from both sides allow for a control on the optical properties, in particular, Rs and Ts, thereby allowing for optimization of the polarization properties to meet customers' needs.

Additionally, the results of FIGS. 17-20 demonstrated that formation of the grid structural body 20 from a material transparent to light in the usage band, followed by deposition of an absorptive layer thereon allows for an adjustment of the polarization properties to meet customers' needs through a control on how the absorptive layer is deposited (the material, the thickness, the deposition width, the formation state on the ends of the protruding portions, and the like). Similarly, it was demonstrated that desired polarization properties can be obtained through controls on and formations of the reflective layer and multilayer.

(8) Thickness of Reflective Layer

The average values of the optical properties (Tp, Rp, Ts, Rs, and CR) of the models of the polarization element 1 for wavelengths of 430 to 680 nm were plotted for comparisons when the thickness of the reflective layer as the optical functional layer 30 (the thickness of the thickest portion of the reflective layer adhered to the protruding portions 22) was varied. The comparison results are presented in FIG. 21.

Figure 21:
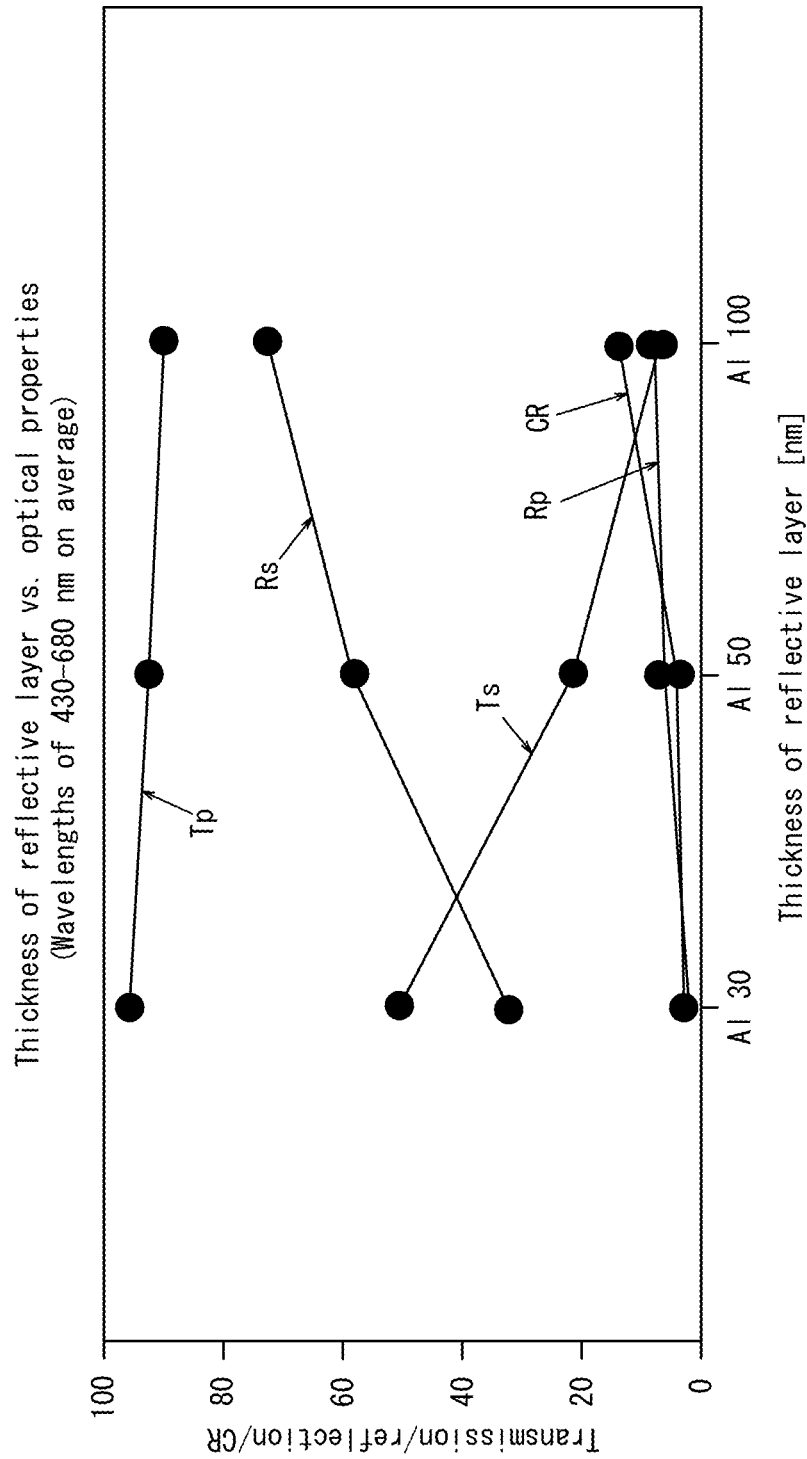
FIG. 21 is a graph for comparing the optical properties when the thickness of the reflective layer formed on the protruding portions was varied in the example.

From the results in FIG. 21, it was confirmed that the polarization properties changed when the thickness of the reflective layer was varied from 30 nm to 100 nm at a predetermined interval. This therefore indicated that formation of the grid structural body 20 from a material transparent to light in the usage band, followed by deposition of a reflective layer by controlling the thickness of the reflective layer allows for a control on the optical properties, in particular, Rs and Ts, thereby allowing for optimization of the polarization properties to meet customers' needs by through a control only on the thickness of the reflective layer.

(9) Height Range of Coverage of Protruding Portions by Reflective Layer

Figure 27A:
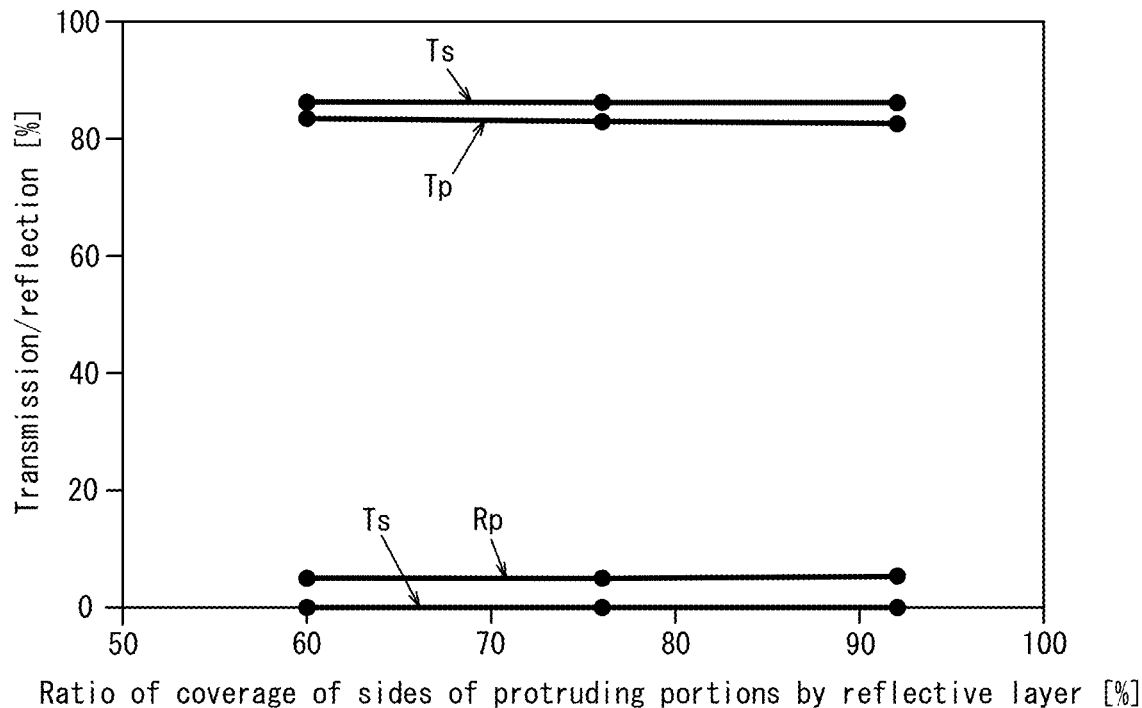
FIG. 27A is a graph for comparing the optical properties when the height range of coverage of the protruding portion by a reflective layer formed on ends and a part of sides of protruding portions (ratio of the height range covered by the optical functional layer to the height of the protruding portion) was varied in the example.

The average values of the optical properties (Tp, Rp, Ts, Rs, and CR) of the models of the polarization element 1 for wavelengths of 430 to 680 nm when the ratio of the range of coverage of the protruding portions 22 by the reflective layer formed as the optical functional layer on the ends and the sides of the protruding portions 22 (ratio (%) of the height range HX of convered by the optical functional layer, to the height H of the protruding portions) was varied. Of the comparison results, Tp, Rp, Ts, and Rs are plotted in FIG. 27A, and the contrast is plotted in FIG. 27B.

Figure 27B:
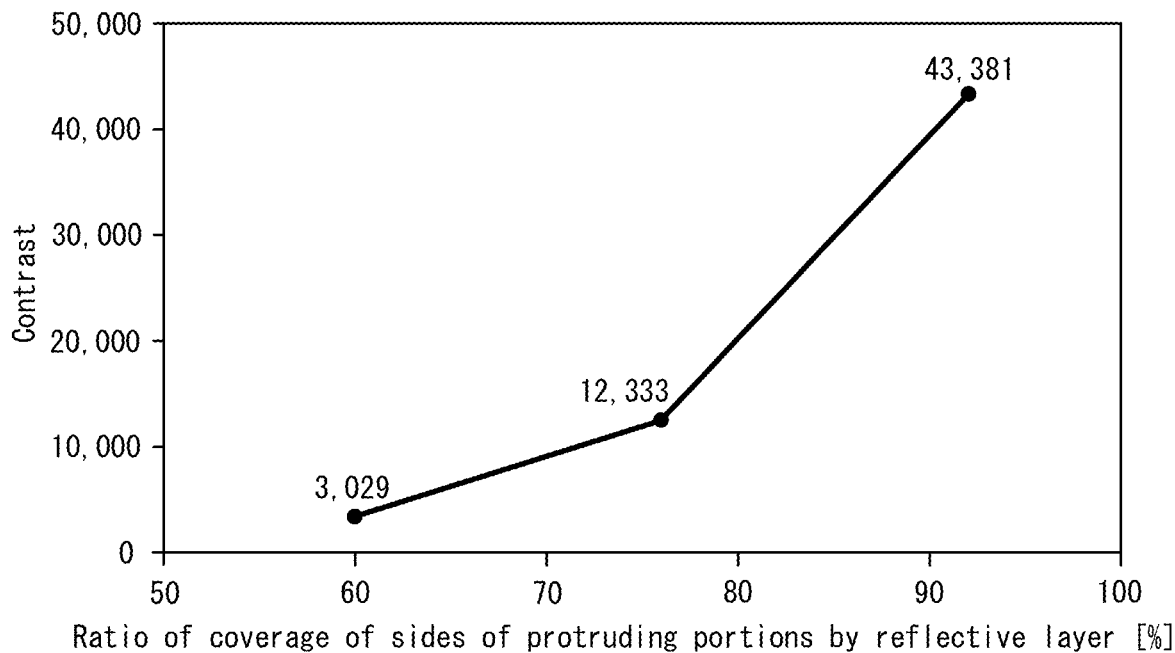
FIG. 27B is a graph for comparing the contrast when height range of coverage of the protruding portion by the reflective layer formed on the ends and a part of the sides of the protruding portion was varied in the example.

The results in FIG. 27 demonstrated that a greater ratio (HX/H) of the coverage of the protruding portion sides of the protruding portions 22 by the reflective layer improved the contrast characteristics while maintaining good optical properties. In FIG. 27B, the CR characteristic further improved when the ratio of the coverage of the protruding portion sides of the protruding portions 22 by the reflective layer increased from 60%, to 76%, and further to 92%. This therefore indicated that formation of the grid structural body 20 from a material transparent to light in the usage band, followed by deposition of optical functional layer 30 by controlling the deposition range of the optical functional layer 30 on the sides of the protruding portions 22 of the grid structural body 20 allows for a control on the optical properties, in particular, the contrast, thereby providing the polarization properties to meet customers' needs.

(It is not formed on the base section 21; the optical functional layer 30 formed even on a part of the base section 21 would reduce the Tp characteristics.)

(10) Type of Optical Functional Layer

Figure 22A:
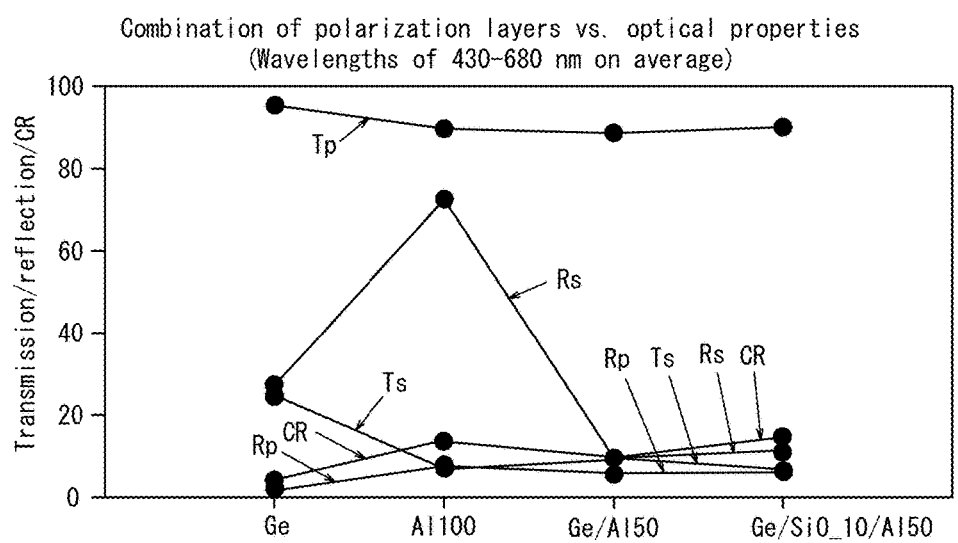
FIG. 22A is a graph for comparing the optical properties when the combination of layers in the optical functional layer formed on the protruding portions was varied in the example.
Figure 22B:
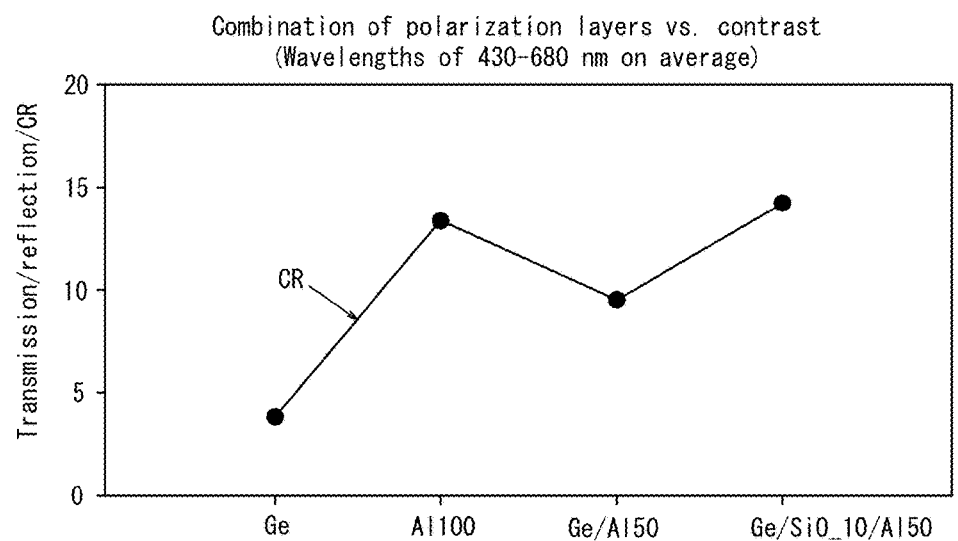
FIG. 22B illustrates only the result of CR in the optical properties illustrated in FIG. 22A for better understanding.

The average values of optical properties (Tp, Rp, Ts, Rs, and CR) of the model of polarization element 1 for wavelengths of 430 to 680 nm were plotted for comparisons among different combinations of the absorptive layer, the reflective layer, and the dielectric layer as the optical functional layer 30. The comparison results are presented in FIG. 22A. In FIG. 22A, "Ge" represents an optical functional layer 30 including an absorptive layer of Ge, "Al100" represents an optical functional layer 30 including a reflective layer of Al having a thickness of 100 nm, "Ge/Al" represents an optical functional layer 30 being a laminate of an absorptive layer of Ge and a reflective layer of Al having a thickness of 100 nm, and "Ge/SiO$_2$ 10/Al50" represents an optical functional layer 30 being a laminate of an absorptive layer of Ge, a dielectric layer made of SiO$_2$ having a layer thickness of 10 nm, and a reflective layer of Al having a layer thickness of 50 nm. In FIG. 22B, only the CR results of the optical properties plotted in FIG. 22A are plotted.

The results in FIG. 22A demonstrated that Rs can be controlled through selection of the type, e.g., an absorptive layer (Ge) or a reflective layer (Al), of the optical functional layer to be deposited according to the purpose, which allows for selective production of either an absorption-type polarization element or a reflection-type polarization element. In addition, it was demonstrated that lamination of the reflective layer (Al) and the absorptive layer (Ge) can provide an absorption polarization element having an even further reduced Rs compared to the case where only the absorptive layer is used.

Further, the results of FIGS. 22A and 22B demonstrated that the combination of the reflective layer (Al)/dielectric layer (SiO$_2$)/absorptive layer (Ge) improved the contrast while maintaining the polarization properties comparable to that of the dual-layered structure of the reflective layer and the absorptive layer.

In this way, it is possible to optimize the polarization properties to meet customers' needs through configurations of the optical functional layer.

Example 2

A sample of a polarization element 1 as illustrated in FIG. 6B was actually fabricated including a substrate 10 made of glass, a grid structural body 20 which was made of a UV curable resin (acrylic resin) and included a base portion 21 provided along a surface of the substrate 10 and protruding portions 22 protruding from the base portion 21 in a grid, and an optical functional layer 30 made of an absorptive layer of Ge for absorbing light formed on the protruding portions 22, and a protective layer 40 made of Al$_2$O$_3$.

The following tests (1) and (2) were carried out on the fabricated sample of a polarization element 1.

(1) Observation of Grid Structural Body in Fabricated Sample

Figure 23A:
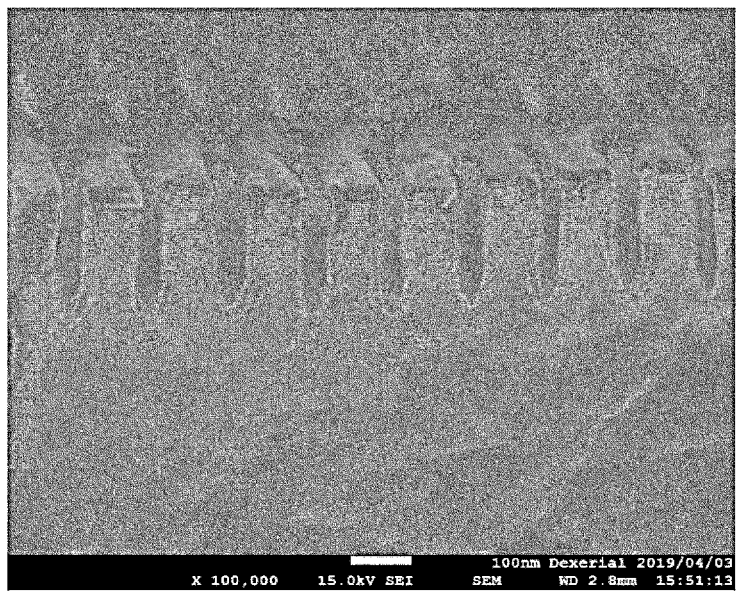
FIG. 23A is an image of a cross-section of a polarization element of the present disclosure which was actually fabricated, taken under magnification by a scanning electron microscope (SEM)
Figure 23B:
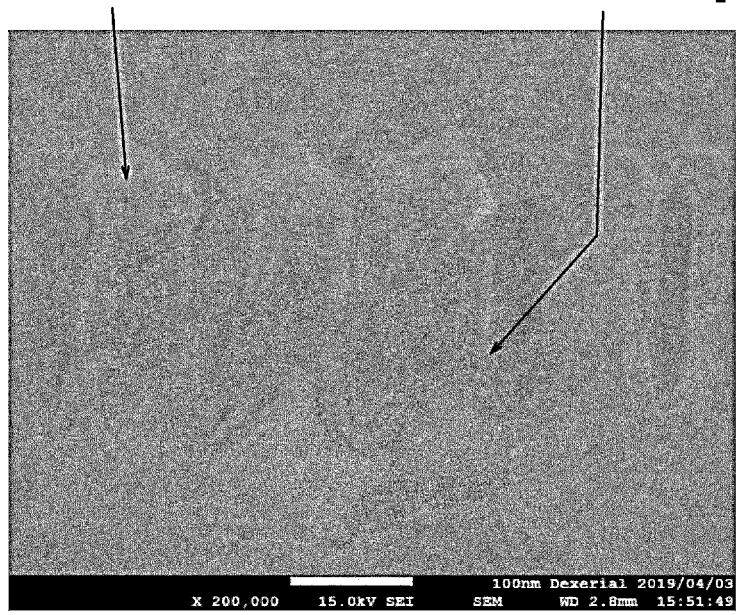
FIG. 23B is a magnified image of a part of FIG. 23A.

Here, FIGS. 23A and 23B are images of a cross-section of a polarization element of the present disclosure which was actually fabricated, taken under magnification by a scanning electron microscope (SEM).

The images in FIGS. 23A and 23B demonstrated that the base portion 21 provided along a surface of the substrate 10 and the protruding portions 22 protruding from the base portion 21 were formed in the grid structural body 20. FIG. 23B also demonstrated that an optical functional layer 30 including an absorptive layer was formed on the ends of the protruding portions 22.

Further, it was demonstrated that the protective layer 40 was formed so as to cover all of the base portion 21, the protruding portions 22 protruding from the base portion 21, and the optical functional layer 30 including the absorptive layer on the ends of the protruding portions 22. In this example, Al$_2$O$_3$ was used as the material to form the protective layer 40 to a thickness of 8 nm using the atomic layer deposition (ALD) technique.

(2) Heat Resistance of Fabricated Sample

A high temperature test was carried out on the fabricated sample of the polarization element 1. The conditions of the high temperature test were such that the sample was allowed to stand at 150° C. for 800 hours.

Figure 24:
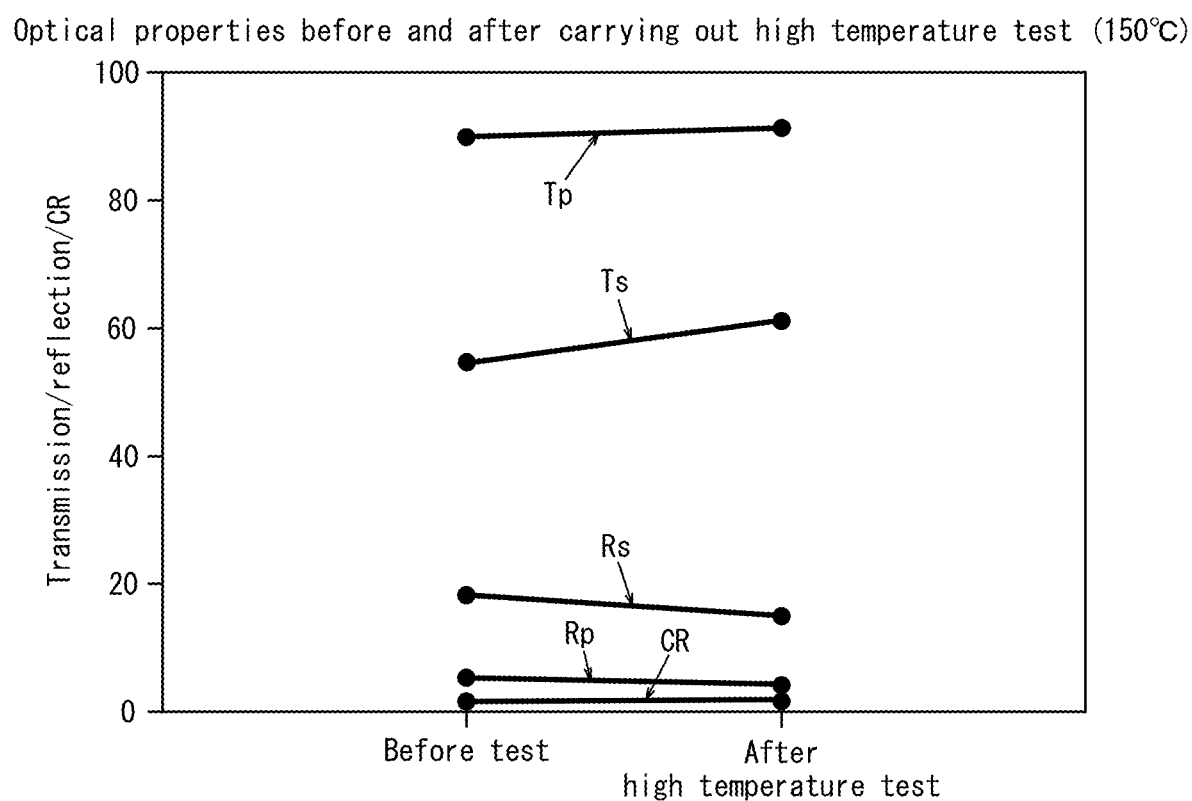
FIG. 24 is a graph for comparing the optical properties before and after an high temperature test in the example.
Figure 25A:
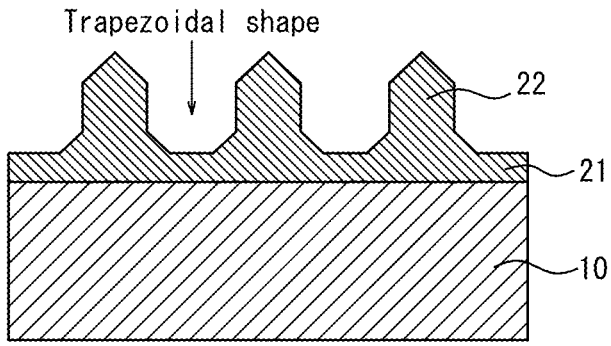
FIG. 25 is a diagram schematically illustrating examples of cross-sectional shapes of the shapes of recessed portions between protruding portions in the base portion of the grid structural body of the polarization element.
Figure 25B:
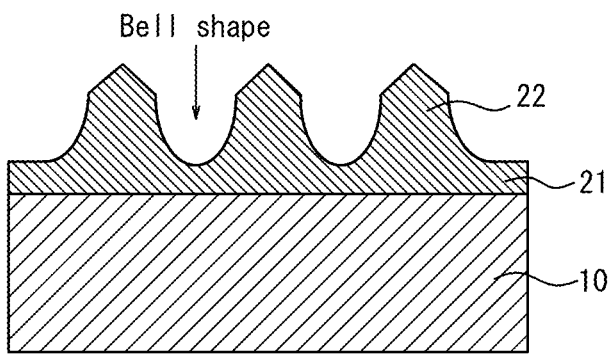
Figure 25C:
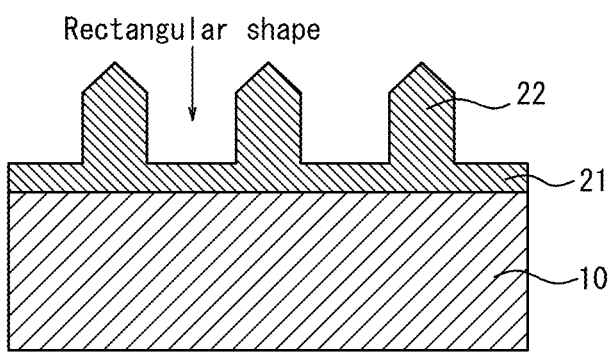
Figure 25D:
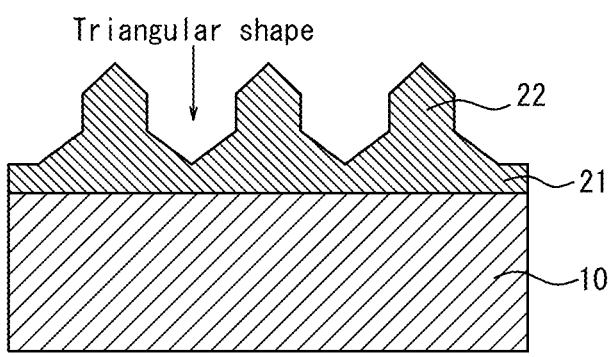

In FIG. 24, the average values of the optical properties (Tp, Rp, Ts, Rs, and CR) for wavelengths of 430 to 680 nm before the high-temperature test and the average values of the optical properties (Tp, Rp, Ts, Rs, and CR) for wavelengths of 430 to 680 nm after the high-temperature test (after being allowed to stand at 150° C. for 800 hours) were plotted for comparisons.

From the results plotted in FIG. 24, it was confirmed that the polarization properties of the polarization element of the present disclosure did not vary significantly even when the polarization element was allowed to stand in a high temperature environment of 150° C. for 800 hours. This therefore indicated that the polarization element can be provided which can be used safely even in a temperature environment required for in-vehicle apparatuses, while meeting customers' needs.

INDUSTRIAL APPLICABILITY

According to the present disclosure, it is possible to provide a polarization element having good polarization properties and excellent in heat dissipation property and manufacturing costs and a method of manufacturing such a polarization element. According to the present disclosure, it is also possible to provide a head-up display apparatus excellent in polarization properties and heat resistance.

REFERENCE SIGNS LIST

1 Polarization element
2 Light source
3 Display element
4 Reflector
5 Display surface
6 Cover portion
10 Substrate
20 Grid structural body
21 Base portion
22 Protruding portion
23 Grid structural body material
30 Optical functional layer
30a Reflective layer
30b Dielectric layer
30c Absorptive layer
31 Optical functional layer material layer
40 Protective layer
50 Heat dissipating member
60 Master plate
61 Master base material
62 Master metal layer
63 Master projecting portion
64 Release layer coating
70 Resist mask
80 Metal layer
100 Head-up display apparatus

The invention claimed is:

1. A polarization element comprising:
a substrate in a form of a flat plate made of a transparent inorganic material;
a grid structural body which is made of a transparent material, and comprises a base portion provided along a surface of the substrate and protruding portions protruding from the base portion in a grid; and
an optical functional layer which is formed on the protruding portions, and comprises a multilayer having at least an absorptive layer for absorbing light, and a reflective layer for reflecting light, wherein
the grid structural body is directly formed on the substrate and a separate component from the substrate,
the optical functional layer is formed on not only the ends but also the sides of the protruding portions and formed in a range to cover 60% or more of a height of the protruding portions, the optical functional layer is a dual-layered structure including the reflective layer and the absorptive layer, or a three-layered structure further including a dielectric layer between the reflective layer and the absorptive layer, and
the polarization element has a polarization contrast ratio (Tp/Ts) of 3029 or more.

2. The polarization element according to claim 1, wherein the base portion has a thickness of 1 nm or more.

3. The polarization element according to claim 1, wherein the protruding portions have rectangular, trapezoidal, polygonal, or oval shapes in a cross-sectional view perpendicular to an absorption axis direction or a reflection axis direction of the polarization element.

4. The polarization element according to claim 1, wherein the optical functional layer is not formed on the base portion.

5. The polarization element according to claim 1, wherein the inorganic material of the substrate is different from the material of the grid structural body.

6. The polarization element according to claim 1, further comprising a protective layer formed so as to cover at least a surface of the optical functional layer.

7. The polarization element according to claim 6, wherein the protective layer comprises a water-repellent coating or an oil-repellent coating.

8. The polarization element according to claim 1, wherein the optical functional layer further comprises a dielectric layer between the reflective layer and the absorptive layer.

9. A head-up display apparatus comprising the polarization element according claim 1.

10. The head-up display apparatus according to claim 9, further comprising a heat dissipating member provided around the polarization element.

11. A method of manufacturing a polarization element, comprising the steps of:
forming a grid structural body material made of a transparent material on a substrate in a form of a flat plate made of an inorganic material;
forming, by applying nanoimprinting to the grid structural body material, a grid structural body comprising a base portion provided along a surface of the substrate and protruding portions protruding from the base portion in a grid; and
forming, on the protruding portions, an optical functional layer comprising a multilayer having at least an absorptive layer for absorbing light, and a reflective layer, wherein
the grid structural body is directly formed on the substrate and a separate component from the substrate,
the optical functional layer is formed on not only the ends but also the sides of the protruding portions and formed in a range to cover 60% or more of a height of the protruding portions,
the optical functional layer is a dual-layered structure including the reflective layer and the absorptive layer, or a three-layered structure further including a dielectric layer between the reflective layer and the absorptive layer, and
the polarization element has a polarization contrast ratio (Tp/Ts) of 3029 or more.

12. The method of manufacturing a polarization element according to claim 11, wherein the step of forming the optical functional layer comprises forming layers alternately from a plurality of directions on the protruding portions by sputtering or evaporation.

* * * * *